(12) United States Patent
McGraw et al.

(10) Patent No.: US 12,722,581 B2
(45) Date of Patent: Sep. 1, 2026

(54) OFF-ROAD JACK VEHICLE MOUNTING SYSTEM

(71) Applicant: Harbor Freight Tools USA, Inc., Calabasas, CA (US)

(72) Inventors: Andrew McGraw, Newbury Park, CA (US); Craig Steinfels, Powell, OH (US)

(73) Assignee: Harbor Freight Tools USA, Inc., Calabasas, CA (US)

( * ) Notice: Subject to any disclaimer, the term of this patent is extended or adjusted under 35 U.S.C. 154(b) by 0 days.

(21) Appl. No.: 18/821,851

(22) Filed: Aug. 30, 2024

(65) Prior Publication Data

US 2026/0061947 A1 Mar. 5, 2026

(51) Int. Cl.
*B60R 11/06* (2006.01)
*B66F 5/04* (2006.01)
*B66F 13/00* (2006.01)

(52) U.S. Cl.
CPC ................ *B60R 11/06* (2013.01); *B66F 5/04* (2013.01); *B66F 13/00* (2013.01)

(58) Field of Classification Search
CPC ........... B60R 11/06; B60R 5/04; B60R 13/00; B60R 2011/0075; B60R 5/006; B60R 7/08; B60R 2011/0052; B60R 2011/0036; B60R 11/00
See application file for complete search history.

(56) References Cited

U.S. PATENT DOCUMENTS 2,278,232 A * 3/1942 Anderson ............. F17C 13/084 211/180
5,979,953 A * 11/1999 Rinehart ................. B60R 19/48 293/106
8,220,764 B2 * 7/2012 Ziaylek .................. A62B 25/00 248/316.1
9,821,729 B2 * 11/2017 Zhou ....................... B60R 11/06
10,471,907 B2 * 11/2019 Zhou ....................... B60R 11/06
(Continued)

FOREIGN PATENT DOCUMENTS

CN 209505635 U 10/2019
CN 209634395 U 11/2019

OTHER PUBLICATIONS 1.5 Ton "Talon" Mount 2.0. Accessed Aug. 28, 2024. ProEagle.com. https://www.proeagle.com/collections/accessories-1/products/1-5-ton-talon-jack-mount.
(Continued)

*Primary Examiner* — Adam J Waggenspack
(74) *Attorney, Agent, or Firm* — Foley & Lardner LLP

(57) ABSTRACT

A bracket for a vehicle jack may include a first support including a first pair of wheel wells and a second support coupled to the first support by one or more longitudinal members, the second support including a second pair of wheel wells. The bracket may include a cover rotatably coupled to the second support and moveable between a storage position and an open position. The bracket may include a locking mechanism to releasably secure the cover in the storage position, the locking mechanism including: a riser positioned laterally between the second pair of wheel wells, a cap rotatably coupled to the cover to releasably couple to the riser; and an aperture within the cover to receive at least one of the cap or the riser, such that the cap and riser when releasably coupled restrict rotation of the cover from the storage position to the open position.

20 Claims, 34 Drawing Sheets

(56) References Cited

U.S. PATENT DOCUMENTS

| | | | | |
|---|---|---|---|---|
| 11,267,409 | B2 * | 3/2022 | Zhou | B60R 11/06 |
| 2022/0081272 | A1 * | 3/2022 | Litsis | B66F 13/00 |

OTHER PUBLICATIONS

2 Ton "OG" Mount. Accessed Aug. 28, 2024. ProEagle.com. https://www.proeagle.com/collections/accessories-1/products/2-ton-og-mount.

2 Ton Big Wheel "The Beast" Mount 2.0. Accessed Aug. 28, 2024. ProEagle.com. https://www.proeagle.com/collections/accessories-1/products/big-wheel-beast-jack-mount.

3 Ton "Kratos" Mount 2.0. Accessed Aug. 28, 2024. ProEagle.com. https://www.proeagle.com/collections/accessories-1/products/3-ton-big-wheel-jack-kratos-mount-orj34xm-2-0.

3 Ton Badland—Jack Mounts—Harbor Freight Off-road Floor Jack. Internet Sales Posting, Review, and Associated Photographs. Accessed Apr. 15, 2026. 911motorsports.net. Review posted May 1, 2023. https://www.911motorsports.net/3-Ton-Badland--Jack-Mounts--Harbor-Freight-Off-road-Floor-Jack_p_1119.html?srsltid=AfmBOopRhpkEE4tAyxX1a3CsGB6nVI1erqDOYfa2Y_-ED_a8Tik0QS8hbFU.

Photograph of DeeZee Tonneau Cover and Jack Mounting System, Photographed at 2024 SEMA Automotive Show Nov. 4, 2024,—1 page.

* cited by examiner 432
402
428
700
506
424
500
502
702
702
400
414
100

OFF-ROAD JACK VEHICLE MOUNTING SYSTEM

TECHNICAL FIELD

This disclosure relates to vehicle jacks and vehicle jack storage and mounting systems.

BACKGROUND

A vehicle jack is a piece of equipment used to lift a vehicle at least partially off the ground typically in order to service a lower portion of the vehicle, such as to remove and replace a flat tire. Some vehicle jacks, such as off-road jacks, may be equipped with larger tires and be heavier than a standard vehicle jack, such that they may not fit in conventional jack storage areas under a vehicle seat or in the spare tire well. As such, the storage and securing of a vehicle jack such as an off-road jack may be expensive or problematic for users.

SUMMARY

At least one embodiment relates to a bracket for a vehicle jack, including: a first support including a first pair of wheel wells; a second support coupled to the first support by one or more longitudinal members, the second support including a second pair of wheel wells; a cover rotatably coupled to the second support and moveable between a storage position and an open position, the cover also including an aperture; and a locking mechanism configured to releasably secure the cover in the storage position, the locking mechanism including: a riser extending from the second support and positioned laterally between each wheel well in the second pair of wheel wells; a cap rotatably coupled to the cover and configured to releasably couple to the riser. The aperture receives at least one of the cap or the riser through the cover, such that the cap and riser when releasably coupled restrict rotation of the cover from the storage position to the open position.

In some embodiments, the cap is rotatably coupled to the riser such that the cap may rotate relative to the riser.

In some embodiments, the cap includes: a head with a first diameter; a shaft configured to pass through the aperture, the aperture having a second diameter less than the first diameter; and a c clip coupled to the shaft on an opposing side of the cover relative to the head, wherein the c clip and the head rotatably couple the cap to the cover, such that the cap rotates relative to the cover to engage the riser and the cap rotates with the cover between the storage position and the open position.

In some embodiments, the locking mechanism further includes a locking pin configured to engage at least one of the cover, the cap, or the riser to prevent the cap from decoupling from the riser.

In some embodiments, bracket, the cap includes a shaft configured to pass through the aperture and wherein the locking pin passes through the cover and the shaft to restrict rotation of the cap relative to the cover.

In some embodiments, bracket, a portion of the riser passes through the aperture and the cap, and the locking pin passes through the portion of the riser passing through the cap to prevent the cap from decoupling from the riser.

In some embodiments, the cap is releasably coupled to the riser via threads.

In some embodiments, the aperture is an elongated slot to receive the riser.

In some embodiments, at least one of the first support or the second support includes a handle support to receive a piece of a handle of the vehicle jack.

In some embodiments, bracket, the handle support positions the piece of the handle at position substantially aligned with at least one of the first pair of wheel wells or the second pair of wheel wells.

In some embodiments, at least a portion of the first pair of wheel wells extend at least partially above an axle height of a wheel for the vehicle jack.

Another embodiment relates to a vehicle jack mounting system, including: a bracket, including: one or more longitudinal members positioned along a longitudinal axis of the bracket; a rear support coupled to a first end of the one or more longitudinal members, the rear support including a plurality of rear wheel wells; a front support coupled to a second end of the one or more longitudinal members opposite the first end, the front support including a plurality of front wheel wells; one or more handle supports coupled to at least one of the rear support or the front support; a cover rotatably coupled to the front support and moveable between a first position and a second position different than the first position; and a locking mechanism configured to releasably secure the cover in at least one of the first position or the second position, the locking mechanism including: an aperture in the cover; a first securing member coupled to at least one of the cover or the front support, wherein a portion of the first securing member extends through the aperture; and a second securing member releasably coupled to the portion of the first securing member extending through the aperture, such that the cover is coupled between the first securing member and the second securing member.

In some embodiments, at least one of the first securing member or the second securing member is rotatable relative to the other of the first securing member or the second securing member.

In some embodiments, the first securing member and the second securing member are releasably coupled via threads.

In some embodiments the vehicle jack mounting system further includes a third securing member configured to engage at least one of the cover, the first securing member, or the second securing member to prevent the second securing member from decoupling from the first securing member.

In some embodiments, the first securing member is a cap including a head and a partially threaded shaft configured to extend through the aperture and the second securing member is a partially threaded riser coupled to the front support.

In some embodiments, the vehicle jack mounting system further includes a vehicle jack, the vehicle jack including: a base assembly; a plurality of rear wheels coupled to the base assembly and positioned in the plurality of rear wheel wells; a plurality of front wheels coupled to the base assembly and positioned in the plurality of front wheel wells; and a handle positioned beneath the base assembly in the handle supports, wherein the cover in the first position extends over a top of the vehicle jack to secure the vehicle jack within the bracket and in the second position rotates away from the vehicle jack to allow the vehicle jack to be removed from the bracket.

Another embodiment relates to a bracket for a vehicle jack, including: a first pair of wheel wells; a second pair of wheel wells coupled to the first pair of wheel wells via one or more longitudinal members; a cover rotatably coupled to at least one of the first pair of wheel wells or the second pair of wheel wells, the cover rotatable between a first position and a second position, the cover also including an aperture; and a locking mechanism configured to releasably secure the cover in at least one of the first position or the second position, the locking mechanism including: a riser coupled to the one of the pair of first wheel wells or the pair of second wheel wells between each wheel well of the pair of first wheel wells or the pair of second wheel wells; a cap rotatably coupled to the cover and configured to selectively couple to the riser. The aperture receives at least one of the cap or the riser through the cover, such that the cap and riser when releasably coupled restrict rotation of the cover from the first position to the second position.

In some embodiments, the bracket further includes a locking pin configured to engage at least one of the cover, the cap, or the riser to prevent the cap from decoupling from the riser.

In some embodiments, the other of the pair of first wheel wells or the pair of second wheel wells includes: a bottom flange lying in a first plane; and a top flange lying in a second plane which intersects the first plane at an acute angle.

BRIEF DESCRIPTION OF THE DRAWINGS

The disclosure will become more fully understood from the following detailed description, taken in conjunction with the accompanying figures, wherein like reference numerals refer to like elements, in which:

FIG. 6 is a perspective view of a second end of a bracket for securing a vehicle jack according to another embodiment.

DETAILED DESCRIPTION OF THE DRAWINGS

Figure 1:
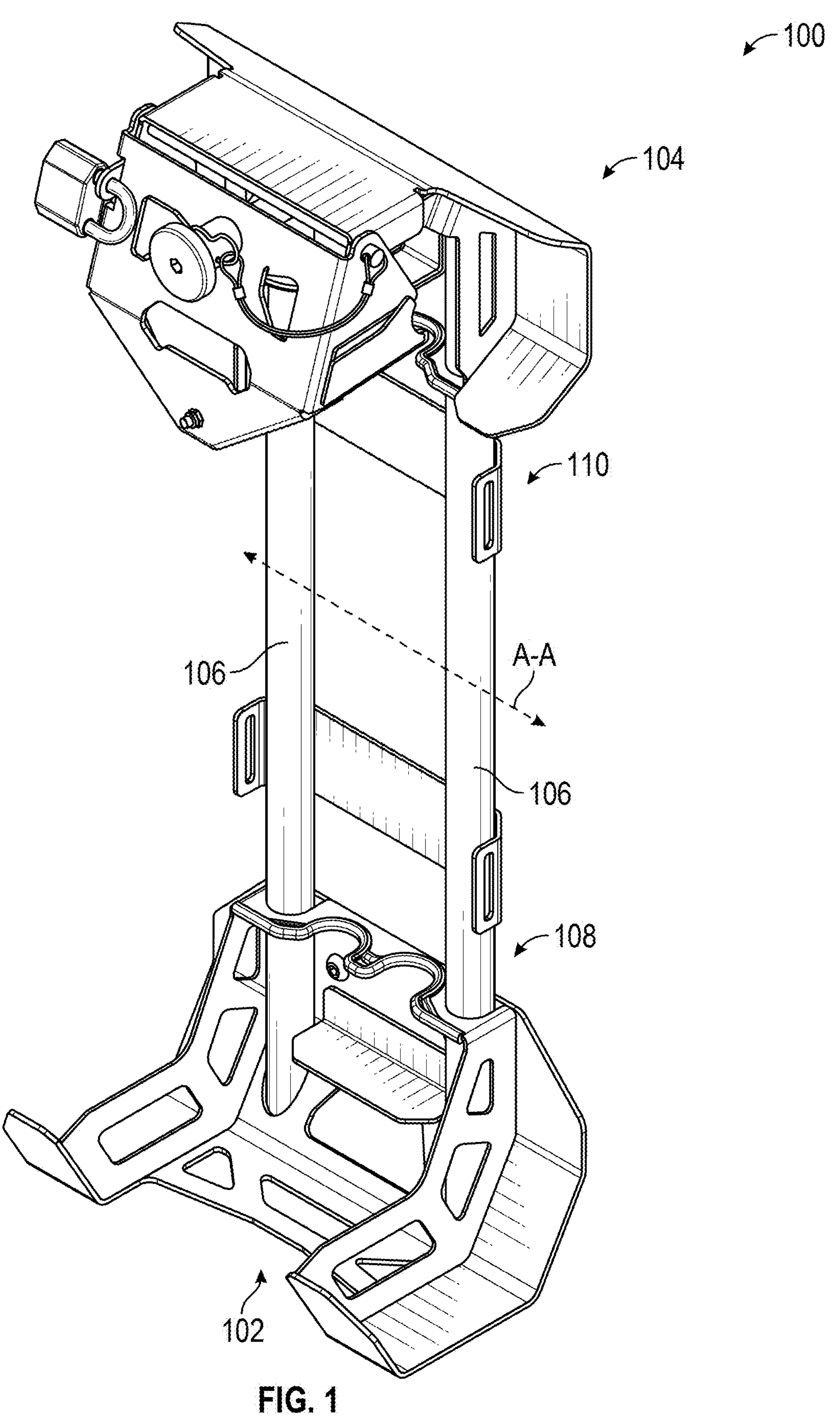
FIG. 1 is a perspective view of a bracket for securing a vehicle jack.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

As shown generally in the FIGURES, a bracket 100 for a vehicle jack 200 is shown. A vehicle jack such as an off-road vehicle jack 200 may include a pair of rear wheels 204 and a pair of front wheels 208 coupled to a base assembly 214, a hydraulic actuator 216 coupled to the base assembly 214, a lever such as a handle 212 to operate the hydraulic actuator 216, and a pressure release 218 configured to reduce the pressure within the hydraulic actuator 216.

The bracket 100 may secure the vehicle jack 200 to a vehicle for transportation or storage. The bracket 100 includes one or more longitudinal members 106 positioned along a longitudinal axis, where the longitudinal axis extends along the length of the bracket 100 between a rear support 102 and a front support 104. The rear support 102 is coupled to a first end 108 of each of the one or more longitudinal members 106 and includes a first medial portion 300 extending substantially parallel with the longitudinal members 106 along the longitudinal axis of the bracket 100, a second medial portion 302 extending in a radial direction from the first medial portion 300, and rear wheel wells 202 each configured to receive a rear wheel 204 of the vehicle jack 200. Rear as described herein in relation to the vehicle jack 200 refers to the elements (e.g., wheels) nearest a user during operation of the vehicle jack 200. The front support 104 is coupled to a second end 110 of each of the one or more longitudinal members 106. The front support 104 includes front wheel wells 206 each configured to receive a front wheel 208 of the vehicle jack 200. The bracket 100 additionally includes one or more handle supports 210 coupled to one or more of the rear support 102 or the front support 104. The one or more handle supports 210 are configured to receive one or more pieces of the handle 212 of the vehicle jack 200. A cover 414 is coupled to the front support 104 and is pivotably movable between a storage position, shown in FIG. 4, and an open position, shown in FIG. 6. The front support 104 includes a locking mechanism to lock the cover 414 in the storage position. The locking mechanism includes a riser 500 (e.g., a post, a riser, a rod, an extension, etc.) coupled to the front support 104 and a cap 506 (e.g., a nut, cap, etc.) rotatably coupled to the cover 414. The cap 506 may extend through the cover 414 and interact with the riser 500 to releasably lock the cover 414 in the storage position.

Turning now to FIG. 1, the bracket 100 for the vehicle jack 200 is shown. In general, the bracket 100 receives the vehicle jack 200 for storage and transportation. The bracket 100 may be mounted on a mounting surface (e.g., a receiving surface, a vehicle, a truck bed, a wall, etc.) either vertically or horizontally using one or more fasteners. The bracket 100 may be substantially made from rigid materials such as metal, wood, plastic, composites, or other materials.

Figure 2:
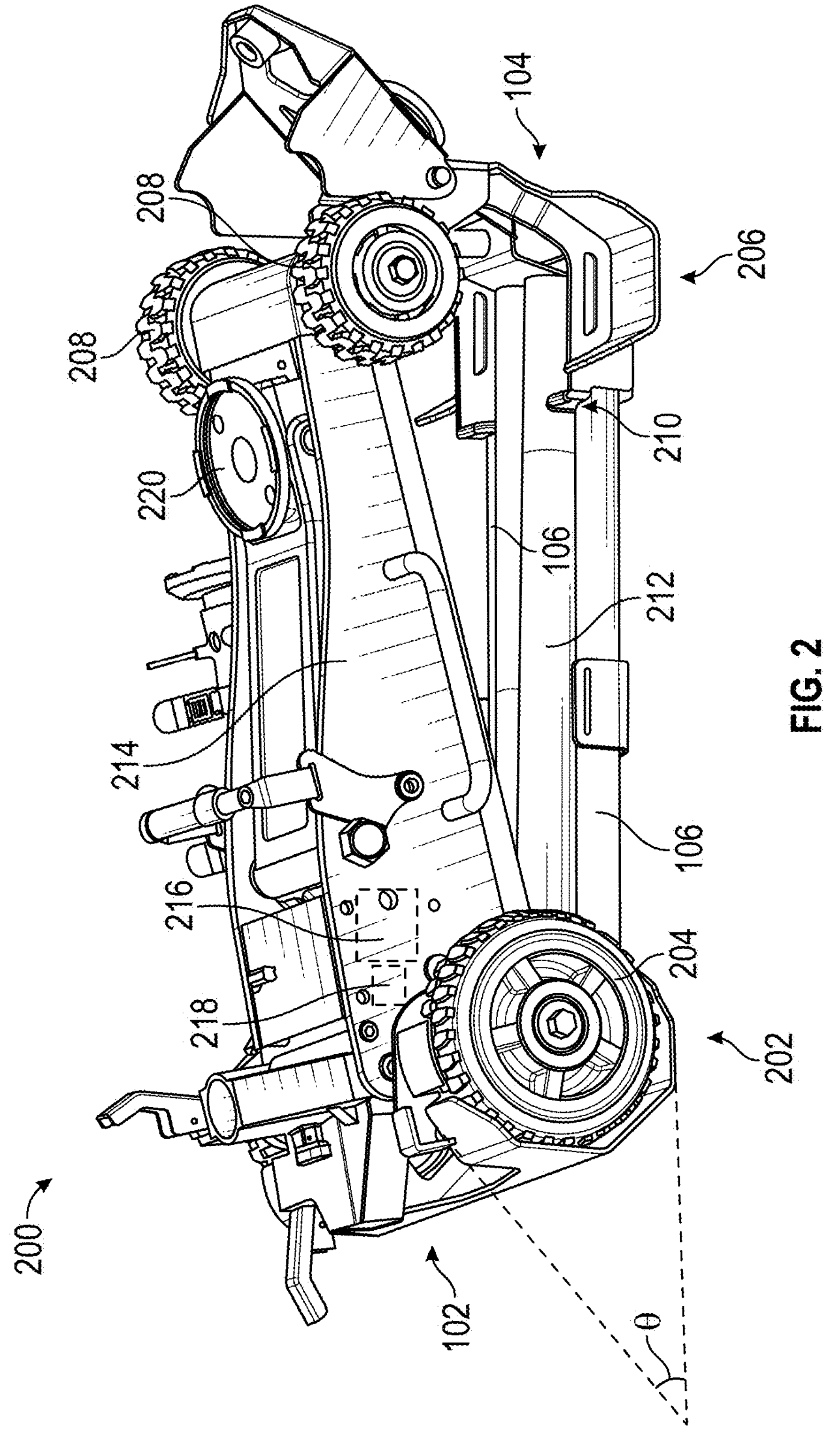
FIG. 2 is a perspective view of a vehicle jack being installed in the bracket of FIG. 1.

The bracket 100 may include the rear support 102 and the front support 104 separated by the longitudinal members 106. As shown in FIG. 2, the rear support 102 may include the rear wheel wells 202 to receive the rear wheels 204 of the vehicle jack 200, and the front support 104 may include the front wheel wells 206 to receive the front wheels 208 of the vehicle jack 200. The rear support 102 and the front support 104 may also each include one or more handle supports 210. The handle 212 of the vehicle jack 200 may be disassembled into one or more pieces and the pieces may be secured in the handle support 210 beneath the vehicle jack 200 in the bracket 100. Referring again to FIG. 1, the bracket 100 includes one or more of the longitudinal members 106 separating the rear support 102 from the front support 104. The longitudinal members 106 have the first ends 108 and the second ends 110 and are positioned along a longitudinal axis of the bracket 100. The bracket 100 is shown including two of the longitudinal members 106, however in other embodiments the bracket 100 may include any number of the longitudinal members 106. A first one of the longitudinal members 106 is positioned substantially parallel to a second one of the longitudinal members 106. The longitudinal members 106 are positioned within a plane that is substantially parallel to the mounting surface. While shown as round tubes (e.g., cylinders, etc.), the longitudinal members 106 may be other shapes.

In some embodiments, the bracket 100 may be adjustable in order to accommodate vehicle jacks 200 having different sizes or configurations. For example, in some embodiments, the longitudinal members 106 may each be formed of telescoping tubes that slide relative to one another and allow the distance between the front support 104 and the rear support 102 to be changed. In some embodiments, the front support 104 and/or the rear support 102 may be slidable on the longitudinal members 106 such that the longitudinal distance between the front support 104 and the rear support 102 may be changed by securing the front support 104 and/or the rear support 102 at different longitudinal locations along the longitudinal members 106. In some embodiments, the front support 104 and/or rear support 102 may be configured to receive longitudinal members 106 of different lengths and configurations.

Figure 3:
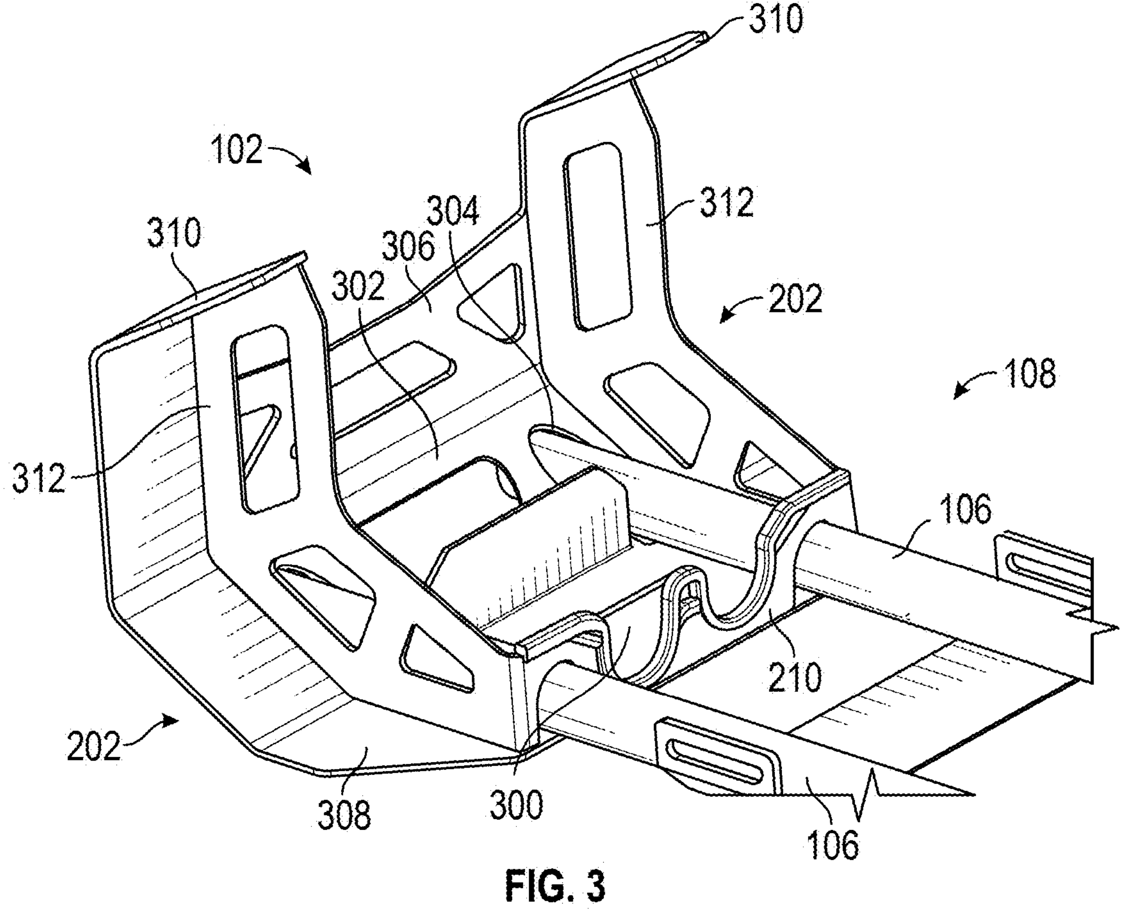
FIG. 3 is a perspective view of a first end of the of FIG. 1.

The rear support 102 is coupled to one or more of the longitudinal members 106. As shown in FIG. 3, the rear support 102 includes the first medial portion 300. The first medial portion 300 is positioned along the longitudinal axis, within a plane that is substantially parallel to the mounting surface, and the first medial portion 300 is positioned substantially underneath and between the longitudinal members 106. The first medial portion 300 is substantially formed as a solid, flat surface (e.g., a plate, etc.) but may also include one or more apertures or cutouts to reduce the weight of the first medial portion 300.

The rear support 102 also includes the second medial portion 302 coupled to the first medial portion 300. The second medial portion 302 extends from the first medial portion 300 in a radial direction from the longitudinal axis. For example, the second medial portion 302 may be positioned at an angle relative to the first medial portion 300, such as an obtuse angle or an approximately right angle. In other embodiments, the second medial portion 302 may be positioned at any angle relative to the first medial portion 300. The second medial portion 302 is substantially formed as a solid, flat surface (e.g., a plate, etc.) but may also include one or more apertures or cutouts to reduce the weight of the second medial portion 302. The second medial portion 302 may include one or more apertures 304 to receive the first ends 108 of the longitudinal members 106. In some embodiments, the longitudinal members 106 may terminate at the second medial portion 302.

The rear support 102 additionally includes a third medial portion 306 coupled to the second medial portion 302. The third medial portion 306 extends from the second medial portion 302 in a radial direction from the longitudinal axis. For example, the third medial portion 306 may be positioned at an angle relative to the second medial portion 302, such as an obtuse angle or an approximately right angle. As such, the third medial portion 306 may be positioned at a substantially right angle relative to the first medial portion 300. In other embodiments, the third medial portion 306 may be positioned at any angle relative to the second medial portion 302 or the first medial portion 300. The third medial portion 306 is substantially formed as a solid, flat surface (e.g., a plate, etc.) but may also include one or more apertures or cutouts to reduce the weight of the third medial portion 306. The third medial portion 306 may be configured to engage a portion the vehicle jack 200 and at least partially prevent the vehicle jack 200 from escaping the bracket 100.

The rear support 102 may include the rear wheel wells 202. The rear wheel wells 202 are configured to receive the rear wheels 204 of the vehicle jack 200 and extend at least partially around the rear wheels 204 to secure the rear wheels 204 of the vehicle jack 200 in the bracket 100. For example, the rear wheel wells 202 may be curved or faceted and may substantially form at least part of a circle or an arc. As another example, the rear wheel wells 202 may comprise one or more substantially flat sections (e.g., plates, etc.) positioned at various angles to at least partially encircle the rear wheels 204 of the vehicle jack 200. In the embodiment of FIG. 3, the rear wheel wells 202 substantially form a similar shape as the first medial portion 300, the second medial portion 302, and the third medial portion 306 of the rear support 102, having similar angles therebetween.

The rear wheel wells 202 may include one or more bottom flanges 308 and one or more top flanges 310. The position and/or angle of the top flanges 310 relative to the bottom flanges 308 may help to additionally secure the rear wheels 204 of the vehicle jack 200. For example, the top flanges 310 extend inwards from the widest part of the rear wheel wells 202 above an axle height of the rear wheels 204, forming an overhang that prevents the rear wheels 204 from being inserted/removed from the rear wheel wells 202 in a direction perpendicular to the longitudinal axis of the bracket 100. In some embodiments, an end of the top flanges 310 is angled inwards towards the front support 104, such that the rear wheels 204 cannot be inserted/removed straight out of the rear wheel wells 202 in a direction substantially perpendicular to the longitudinal axis of the bracket 100. Instead, in such embodiments, the rear wheels 204 and therefore the vehicle jack 200 itself, must move both longitudinally (i.e., along the jack) and radially (i.e., away from the jack) to remove the rear wheels 204 from the rear wheel wells 202. In such embodiments, a plane of the top flanges 310 intersects with a plane of the bottom flanges 308 at an acute angle θ as shown in FIG. 2.

The bottom flanges 308 of the rear wheel wells 202 may be positioned at a first height, the first height defined relative to the first medial portion 300 of the rear support 102 or the mounting surface. For example, the first medial portion 300 of the rear support 102 may be positioned against or adjacent to the mounting surface and the bottom flanges 308 of the rear wheel wells 202 may be positioned at the first height from the first medial portion 300 or the mounting surface such that an offset distance is defined therebetween.

The rear support 102 may also include guiding members 312 to assist with alignment and positioning of the vehicle jack 200 and the rear wheels 204 of the vehicle jack 200 within the rear support 102 of the bracket 100. The guiding members 312 may generally extend from the first medial portion 300 to the third medial portion 306 of the rear support 102 and/or from the bottom flanges 308 to the top flanges 310 of the rear wheel wells 202. The guiding members 312 may substantially form a similar shape as the first medial portion 300, the second medial portion 302, and the third medial portion 306 of the rear support 102, having similar angles therebetween. The guiding members 312 may include one or more apertures to reduce the weight of the bracket 100. When the vehicle jack 200 is installed in the bracket 100, the guiding members 312 may be positioned between the rear wheels 204 of the vehicle jack 200 and the body assembly of the vehicle jack 200. In some embodiments, the guiding members 312 engage an inner surface of each of the rear wheels 204 of the vehicle jack 200 to prevent the rear wheels 204 from moving side-to-side (e.g., laterally) in the bracket 100.

Figure 4:
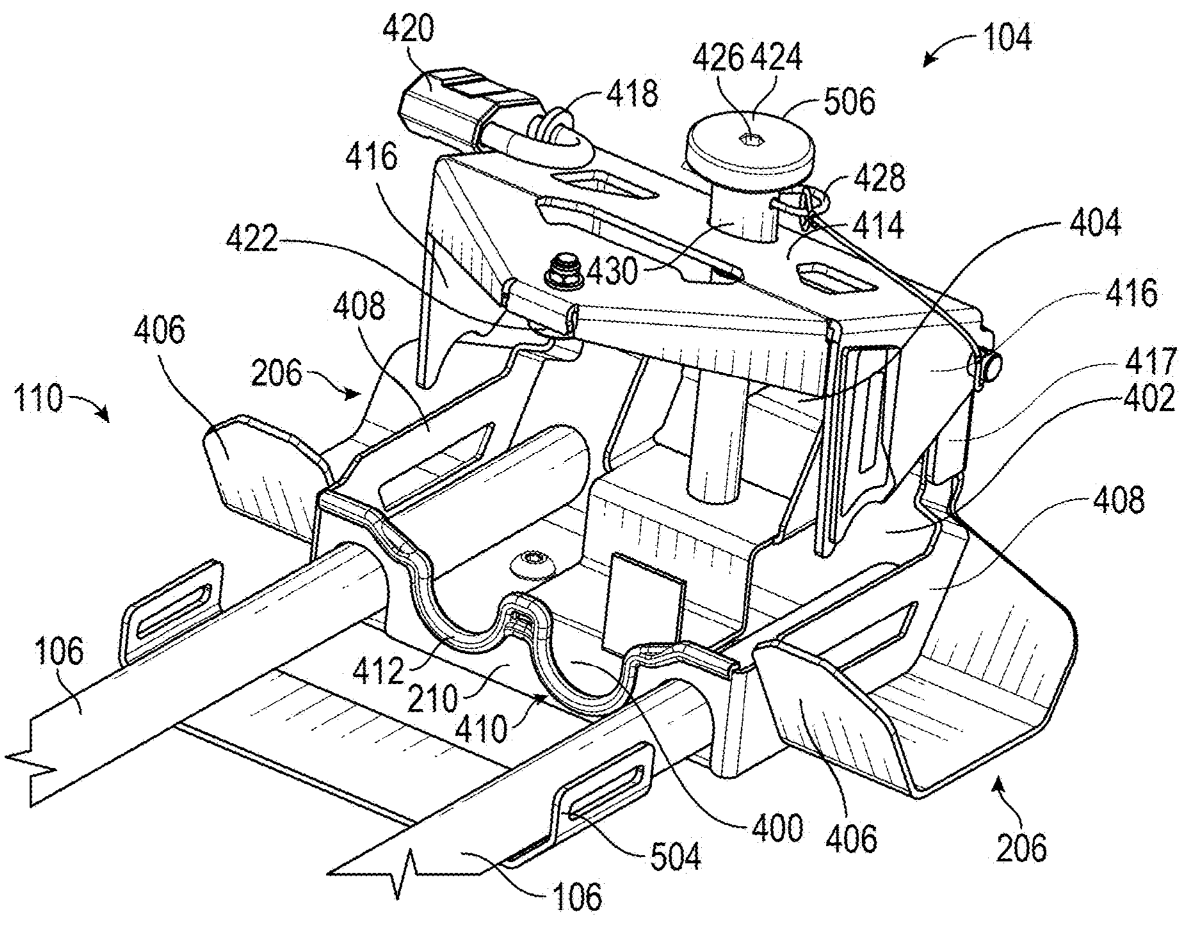
FIG. 4 is a perspective view of a second end of the bracket of FIG. 1 in a storage position.

As shown in FIG. 4, the front support 104 is coupled to one or more of the longitudinal members 106 at the second ends 110 of the longitudinal members 106. The front support 104 includes a first medial portion 400. The first medial portion 400 is positioned along the longitudinal axis, within a plane that is substantially parallel to the mounting surface, and the first medial portion 400 is positioned substantially underneath and between the longitudinal members 106. The first medial portion 400 is substantially formed as a solid, flat surface (e.g., a plate, etc.) but may also include one or more apertures or cutouts to reduce the weight of the first medial portion 400.

The front support 104 also includes a second medial portion 402 coupled to the first medial portion 400. The second medial portion 402 extends from the first medial portion 400 in a radial direction from the longitudinal axis. For example, the second medial portion 402 may be positioned at an angle relative to the first medial portion 400, such as an obtuse angle or an approximately right angle. In other embodiments, the second medial portion 402 may be positioned at any angle relative to the first medial portion 400. The second medial portion 402 is substantially formed as a solid, flat surface (e.g., a plate, etc.) but may also include one or more apertures or cutouts to reduce the weight of the second medial portion 402. The second medial portion 402 may also include one or more apertures to receive the second ends 110 of the longitudinal members 106. In some embodiments, the longitudinal members 106 may terminate at the second medial portion 402.

The front support 104 additionally includes a third medial portion 404 coupled to the second medial portion 402. The third medial portion 404 extends from the second medial portion 402 in a radial direction from the longitudinal axis. For example, the third medial portion 404 may be positioned at an angle relative to the second medial portion 402, such as an obtuse angle or an approximately right angle. As such, the third medial portion 404 may be positioned at a substantially right angle relative to the first medial portion 400. In other embodiments, the third medial portion 404 may be positioned at any angle relative to the second medial portion 402 or the first medial portion 400. The third medial portion 404 is substantially formed as a solid, flat surface (e.g., a plate, etc.) and may be configured to engage a front of the vehicle jack 200 and at least partially prevent the vehicle jack 200 from escaping the bracket 100.

Still referring to FIG. 4, the front support 104 may include one or more of the front wheel wells 206. The front wheel wells 206 are configured to receive the front wheels 208 of the vehicle jack 200 and extend at least partially around the front wheels 208 to secure the front wheels of the vehicle jack 200 in the bracket 100. The front wheel wells 206 may be positioned at the first height, the first height defined relative to the first medial portion 300 of the rear support 102, the mounting surface, or the first medial portion 400 of the front support 104. For example, the first medial portion 300 of the rear support 102 may be positioned against or adjacent to the mounting surface. Additionally, the first medial portion 400 of the front support 104 may be positioned against or adjacent to the mounting surface. The front wheel wells 206 may be positioned at the first height from the first medial portion 300, the first medial portion 400, or the mounting surface, and an offset distance is defined therebetween. As such, the front wheel wells 206 may be positioned at substantially the same height as the rear wheel wells 202. In other embodiments, the front wheel wells 206 may be positioned at a first height defining a second distance from the mounting surface greater than or less than the first distance of the rear wheel wells 202.

The front wheel wells 206 may be shaped to substantially conform to the front wheels of the vehicle jack 200. For example, the front wheel wells 206 may be curved and may substantially form at least part of a circle or an arc. As another example, the front wheel wells 206 may comprise one or more substantially flat sections (e.g., plates, etc.) positioned at various angles to at least partially encircle the front wheels 208 of the vehicle jack 200. In some embodiments, the front wheel wells 206 substantially form a similar shape as the first medial portion 400 and the second medial portion 402 of the front support 104, having similar angles therebetween.

The front wheel wells 206 may include one or more wheel flanges 406 that additionally secure the front wheels 208 of the vehicle jack 200. For example, the wheel flanges 406 extend at least partially above an axle height of the front wheels 208 of the vehicle jack 200. The wheel flanges 406 may be configured to wrap around or further enclose the front wheels 208 of the vehicle jack 200 within the front wheel wells 206. For example, in some embodiments, the front wheel wells 206 may include one or more top flanges as shown in the rear wheel wells 202 and the rear wheel wells 202 may include one or more wheel flanges 406 as shown in the front wheel wells 206.

The front support 104 may also include guiding members 408 to assist with alignment and positioning of the vehicle jack 200 and the front wheels 208 of the vehicle jack 200 within the second end 110 of the bracket 100. The guiding members 408 may generally extend from the first medial portion 400 to the second medial portion 402 or the third medial portion 404 of the front support 104 and/or from the wheel flanges 406 to an upper portion of the front wheel wells 206. The guiding members 408 may include one or more apertures to reduce the weight of the bracket 100. When the vehicle jack 200 is installed in the bracket 100, the guiding members 408 may be positioned between the front wheels 208 of the vehicle jack 200 and the body assembly of the vehicle jack 200. In some embodiments, the guiding members 408 engage an inner surface of each of the front wheels 208 of the vehicle jack 200 to prevent the front wheels 208 from moving side-to-side in the bracket 100.

The front wheels 208 of the vehicle jack 200 may be different in size than the rear wheels 204 of the vehicle jack 200 such that the front wheel wells 206 may be different in size or shape from the rear wheel wells 202. In the embodiment of FIG. 1, the front wheel wells 206 are smaller in size and form a different shape than the rear wheel wells 202. In some embodiments, the rear wheel wells 202 and the front wheel wells 206 may be the same size or shape or may be configured differently.

The bracket 100 may also include one or more of the handle supports 210. The handle supports 210 may be coupled to the rear support 102 and/or the front support 104. As shown in FIG. 3, a first one of the handle supports 210 is coupled to the rear support 102 and as shown in FIG. 4 a second one of the handle supports 210 is coupled to the front support 104. The handle supports 210 are positioned substantially perpendicular to the longitudinal axis and the longitudinal members 106 and include one or more indentations or recesses shown as grooves 410 to support the pieces of the handle 212 in a position parallel to the longitudinal axis and the longitudinal members 106. The pieces of the handle 212 may be positioned generally between and proximate to the longitudinal members 106. A top portion 412 of the handle supports 210 may be made from rubber, foam, or another compressible material to support the pieces of the handle 212.

A lower portion of the grooves 410 may be positioned substantially at the first height, the first height defined relative to the first medial portion 300 of the rear support 102, the mounting surface, or the first medial portion 400 of the front support 104. For example, the first medial portion 300 of the rear support 102 may be positioned against or adjacent to the mounting surface. Additionally, the first medial portion 400 of the front support 104 may be positioned against or adjacent to the mounting surface. The grooves 410 may be positioned at the first height from the first medial portion 300, the first medial portion 400, or the mounting surface, and an offset distance is defined therebetween. As such, the grooves 410 may be positioned at substantially the same height as the rear wheel wells 202 and the front wheel wells 206. In some embodiments, the grooves 410 may be positioned at a different height than the rear wheel wells 114 and the front wheel wells 132.

Continuing with FIG. 4, the bracket 100 may also include the cover 414. The cover 414 is coupled to the third medial portion 404 of the front support 104 and is pivotally movable between a storage position and an open position. In the storage position, the cover 414 extends substantially along the longitudinal axis over the vehicle jack 200 to secure it in position. In the open position, the cover 414 is rotated to extend radially away from the longitudinal axis and allow the vehicle jack 200 to be inserted/removed from the bracket 100. The cover 414 is shown in the storage position in FIG. 4 and in the open position in FIG. 6.

The cover 414 may include one or more side walls 416 coupled to the cover 414 and extending in a radial direction from the cover 414. For example, the side walls 416 may extend in a substantially perpendicular direction from the cover 414. The side walls 416 may be configured to constrain a front axle of the vehicle jack 200. For example, the side walls 416 may include one or more grooves configured to rest against the front axle of the vehicle jack 200.

The bracket 100 may include also include a tab 418 extending through the cover 414. The tab 418 may be fixed to the one of the first medial portion 400, the second medial portion 402, or the third medial portion 404 such that the cover 414 rotates relative to the tab 418. In the storage position as shown in FIG. 4, the tab 418 may extend through the cover 414. The tab 418 may define an aperture to receive a part of a lock, such as a shackle of a padlock 420. The padlock 420 provides security for a user of the bracket 100 as it allows the user to lock and secure the bracket 100 such that the vehicle jack 200 cannot be accessed or removed from the bracket 100 while the lock 420 is secured to the tab 418.

The bracket 100 may additionally include a bumper 422. The bumper 422 may be coupled to an underside of the cover 414. In the storage position, the bumper 422 engages with the base assembly 214 of the vehicle jack to hold and secure the vehicle jack 200 in place in the bracket 100. The bumper 422 may be made from rubber, foam, or another compressible material. In some embodiments, the bumper 422 is positioned to engage with a saddle 220 of the vehicle jack 200 to restrict the saddle 220 from extending away from the base assembly 214.

The front support 104 may also comprise a pivot joint 432. The pivot joint 432 may be positioned on a flange 417 of the third medial portion 404 of the front support 104. The cover 414 may be pivotally coupled to third medial portion 404 via the pivot joint 432. As shown, the pivot joint 432 includes a pivot rod 502 extending through the flange 417 of the third medial portion 404 and through the side walls 416 of the cover 414.

Figure 5:
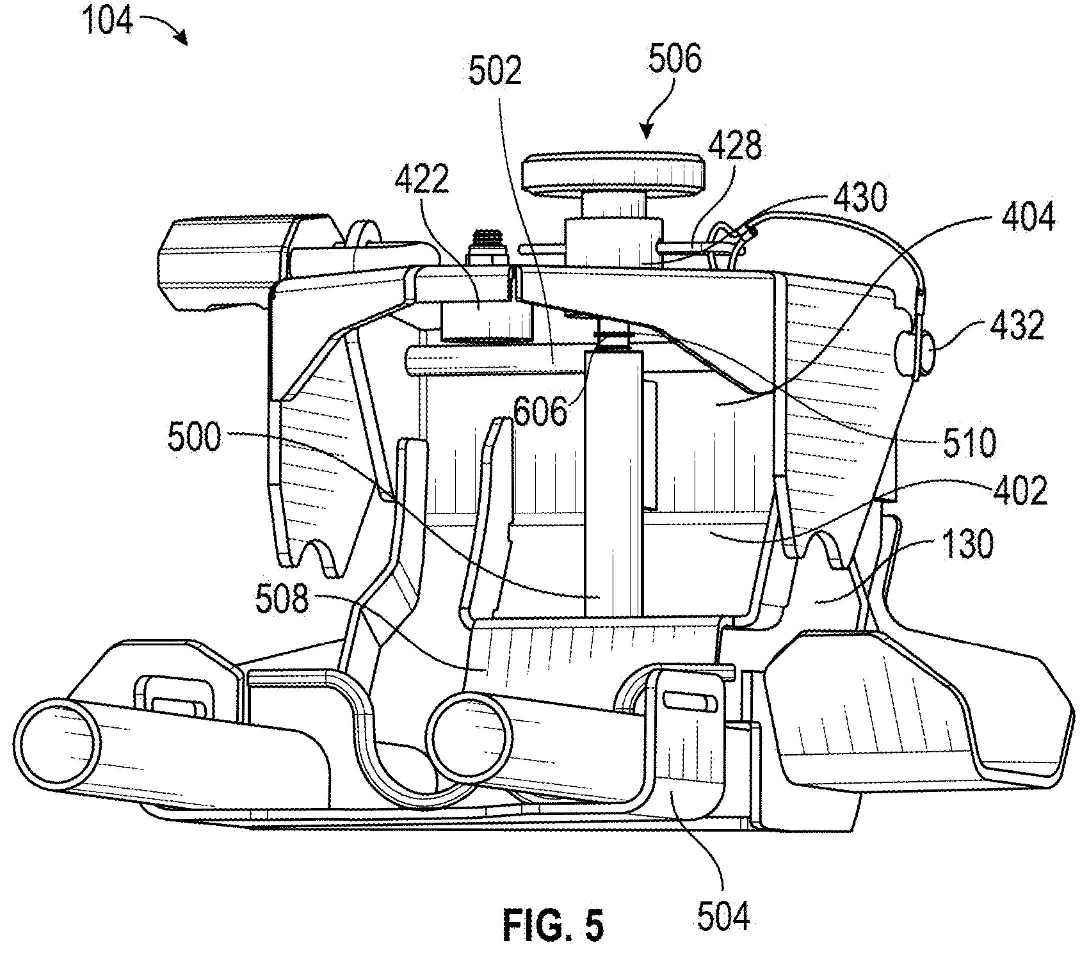
FIG. 5 is another perspective view of the bracket of FIG. 1 in a storage position.

Turning now to FIG. 5, the bracket 100 further includes one or more lateral base support members 504 coupled to the longitudinal members 106. The lateral base support members 504 are positioned along the longitudinal axis, within a plane that is substantially parallel to the mounting surface, and the lateral base support members 504 are positioned substantially underneath, around, and between the longitudinal members 106. The lateral base support members 504 may be coupled to the bracket 100, or may not. The lateral base support members 504 may be movable along the length of the longitudinal members. The lateral base support members 504 may define one or more apertures configured to receive one or more flexible fasteners (e.g., a strap, a bungee cord, etc.). The flexible fasteners couple to the lateral base support members 504 and are configured to encircle the vehicle jack 200 to additionally constrain the vehicle jack 200 and help with coupling the vehicle jack 200 to the bracket 100.

Figure 6:
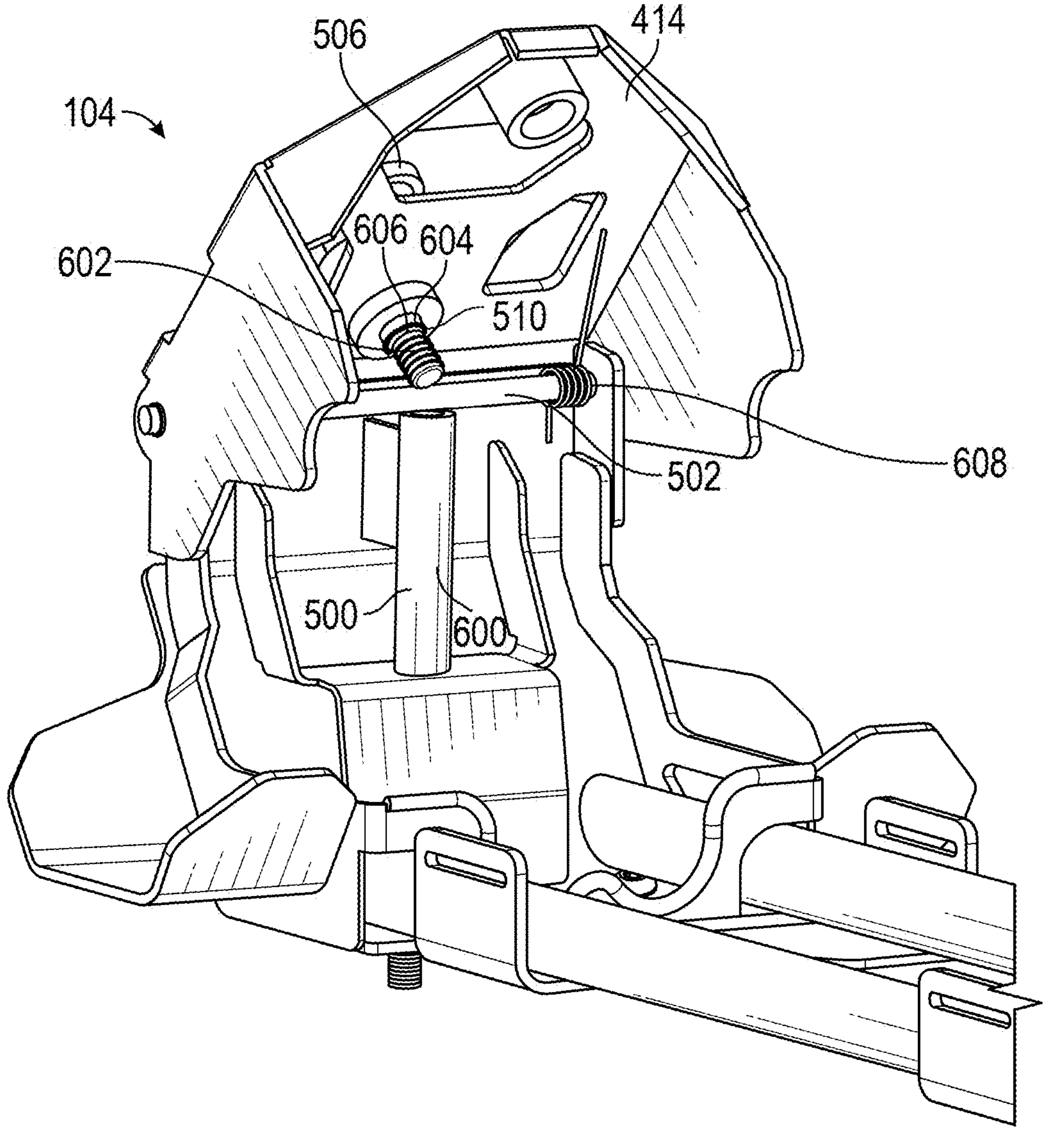
FIG. 6 is a perspective view of the second end of the bracket of FIG. 1 in an open position.

Referring now to FIGS. 5 and 6, the bracket 100 includes a locking mechanism to releasably secure the cover 414 in one of the storage position or the open position. The locking mechanism may include a first securing member such as a riser 500 and a second securing member such as a cap 506. As further described herein, the riser 500 is configured to selectively engage with the cap 506. For example, the riser 500 may be threadably coupled to the cap 506. The riser 500 is configured as an extension (e.g., a shaft, a tube, a rod, etc.) extending in a radial direction from the longitudinal axis towards and proximate to the cover 414. In some embodiments, the riser 500 includes female threads 600 and the cap 506 includes male threads on a shaft 602 while in other embodiments the riser 500 includes male threads and the cap 506 includes female threads. The riser 500 may be coupled to a mount 508 lifting the riser 500 away from the first medial portion 400. In other embodiments, the riser 500 may be directly coupled to the first medial portion 400. The riser 500 may be fixed relative to the front support 104 such that the cover 414 rotates relative to the riser 500.

As shown in FIG. 4-6, the cap 506 includes a head 424 and the shaft 602. The head 424 may include a drive socket 426 configured to receive one or more tools for rotating the cap 506. The cap 506 may also be manually rotated by a user. The shaft 602 extends through an aperture 604 of the cover 414 to engage with the riser 500. In some embodiments, the shaft 602 includes an upper portion of a first diameter and a lower portion of a second diameter less than the first diameter. The lower portion of the shaft 602 may be less than a diameter of the aperture 604 such that the lower portion of the shaft 602 may pass through the aperture 604 but the upper portion of the shaft 602 may not, thereby ensuring the cap 506 does not fall through the aperture 604. The shaft 602 may include a groove 606 containing a clip or fastener shown as a C-clip 510. In some embodiments, the groove 606 is located on the lower portion of the shaft 602 outside of where the shaft 602 passes through the aperture 604. The C-clip 510 rotatably couples the cap 506 to the cover 414. The rotatable coupling allows the cap 506 to rotate relative to the cover 414, and thereby engage/disengage with the riser 500, while securing the cap 506 to the cover 414 such that the cap 506 cannot be pulled out of the cover 414. The rotatable coupling therefore captures the cap 506, and as the cover 414 pivots between the storage position and the open position, the cap 506 moves with the cover 414. In other embodiments, the cap 506 may be rotatably secured to the cover 414 with a pin extending through the shaft 602 of a length greater than a diameter of the aperture 604 or any other fastening means.

In the storage position, the cap 506 may be rotated by a user to threadably couple to the riser 500, thereby securing the cover 414 in the storage position. As described above, the riser 500 may include threads (e.g., the female threads 600, etc.) and the cap 506 may also include threads (e.g., male threads at least partially extending along the shaft 602, etc.). The user may grasp the cap 506 and rotate the cap 506 relative to the riser 500. Depending on the direction of rotation (e.g., clockwise or counterclockwise), the cap 506 may tighten or loosen relative to the riser 500. Once the cap 506 has been tightened, the cover 414 is secured in the storage position.

Referring now specifically to FIGS. 4 and 5, the locking mechanism may include a locking pin 428. The locking pin 428 may be a bridge pin clip wherein its "R" shape releasably secures the locking pin 428 to the riser 500 and/or the cap 506 to provide secure temporary attachment. The locking pin 428 may extend through a collar 430 of the cover 414, the collar 430 extending around the aperture 604 and receiving the upper portion of the shaft 602, and through the shaft 602 of the cap 506 to restrict rotation of the cap 506 relative to the cover 414. In order to disengage the cap 506 from the riser 500, the locking pin 428 must first be removed, allowing the cap 506 to rotate. The locking pin 428 may be flexibly coupled to the front support 104 to ensure the locking pin 428 is not lost when removed from the cap 506. One or more springs 608 (e.g., torsion springs, etc.) may be coupled to the cover the pivot rod 502 to bias the cover 414 towards at least one of the storage position or the open position.

Figure 7:
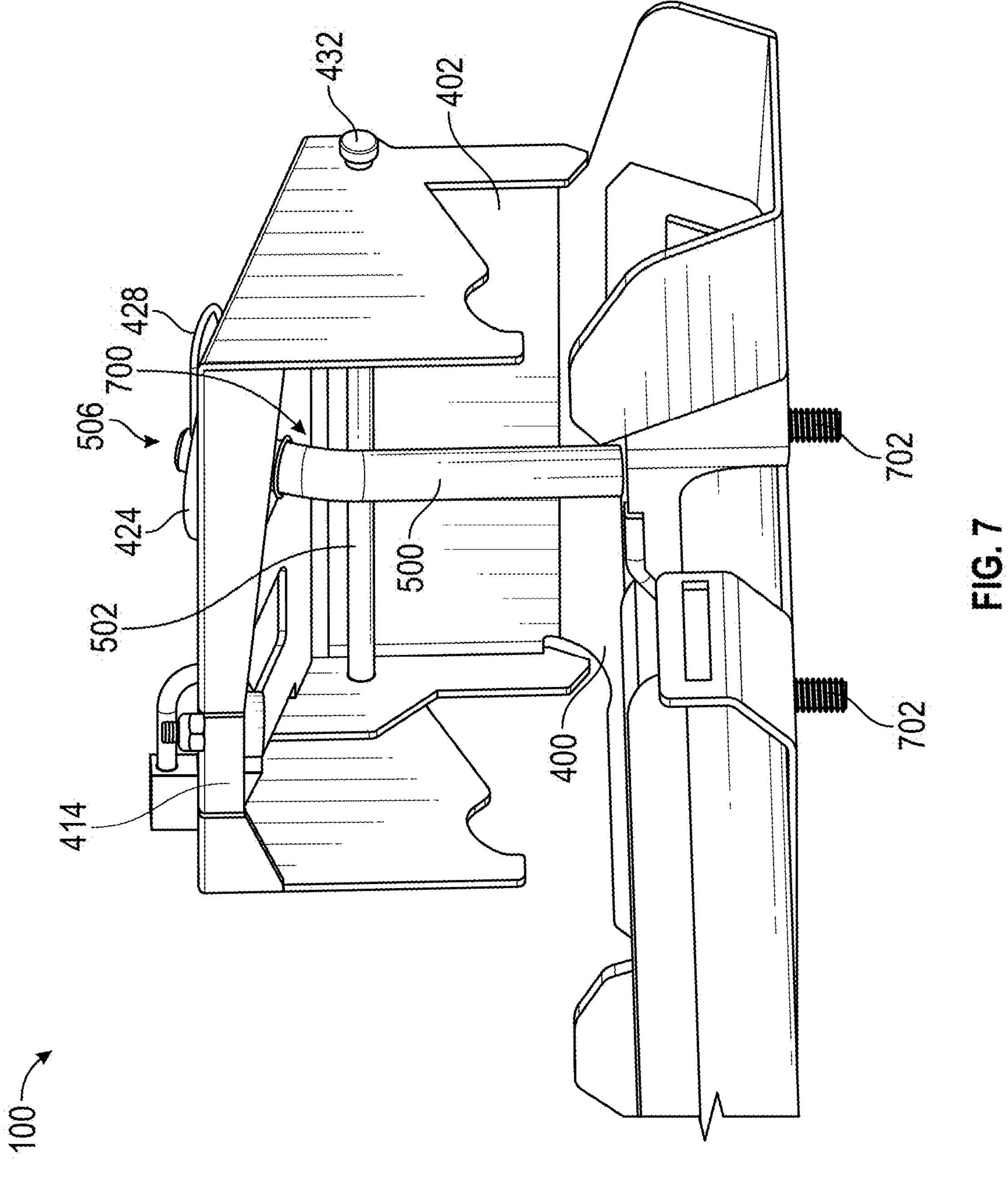
FIG. 7 is a perspective view of a second end of a bracket for securing a vehicle jack according to another embodiment.
Figure 8:
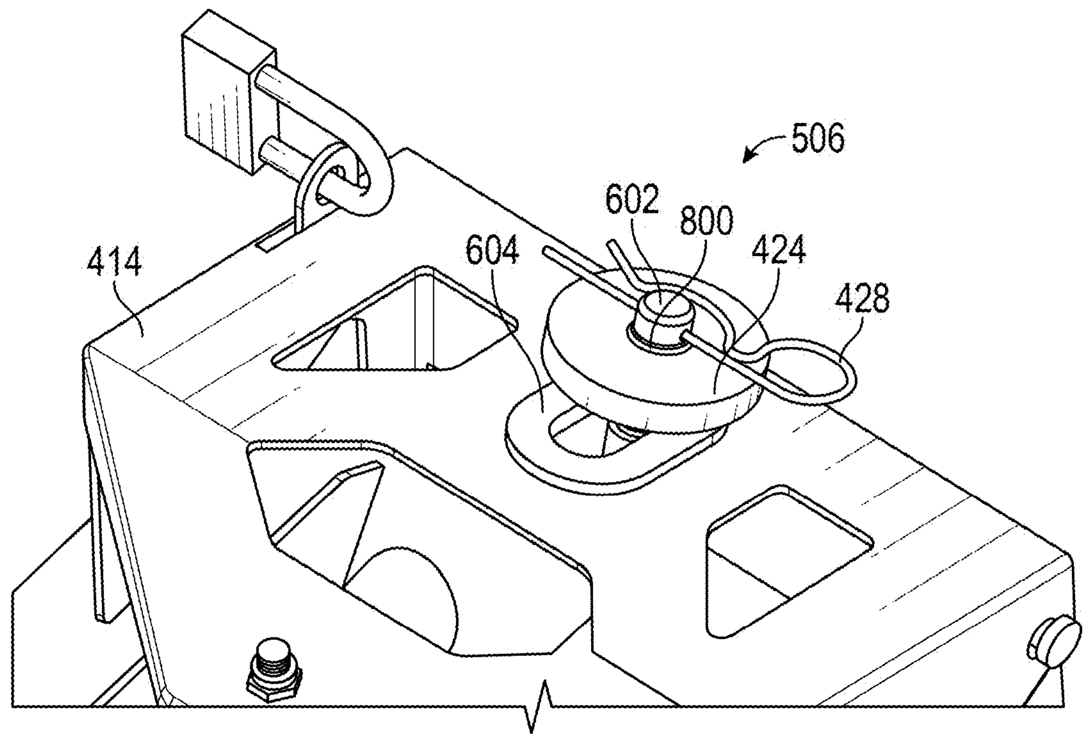
FIG. 8 is a perspective view of a top of the second end of the bracket of FIG. 7.

Referring now to FIGS. 7 and 8, a bracket 100 with a locking mechanism is shown according to another exemplary embodiment. In FIG. 7, the riser 500 includes male threads and the cap 506 includes female thread. The riser 500 is configured substantially as a cylinder (e.g., a tube, a hollow rod, etc.) extending in a radial direction from the longitudinal axis from the first medial portion 400 and the second medial portion 402 of the front support 104 towards and proximate to the cover 414. The riser 500 may include a bent portion 700 proximate to the cover 414, the bent portion 700 defining an angle relative to the riser 500. At least a portion of the bent portion 700 is threaded.

The cap 506 includes a head 424 with a threaded aperture 800. The threaded aperture 800 is configured to engage with the male threads of the riser 500 to secure the cover 414 in the storage position. The cap 506 is prevented from undesirably rotating and disengaging from the riser 500 by the locking pin 428. The locking pin 428 passes through the riser 500 thereby preventing the cap 506 from being threaded off of the riser 500.

In the embodiment shown in FIG. 7, because the riser 500 passes through the cover 414, rather than the cap 506 passing through the cover 414 as shown in FIG. 4-6, the aperture 604 is elongated into a slot along the longitudinal axis. The slot-shaped aperture 604 allows the cover 414 to still rotate between the storage position and the open position without the riser 500 conflicting with the rotation of the cover 414. In operation, moving from the secured storage position, a user removes the locking pin 428 from the riser 500 and rotates the cap 506 until the cap 506 is disengaged from the riser 500. The cap 506 may be flexibly secured to the bracket 100 (similar to locking pin 428 in FIG. 4-6) to ensure the cap 506 is not lost. The cover 414 may then be rotated to the open position to allow a user to insert/remove the vehicle jack 200.

The bracket 100 may include one or more mounting apertures. The mounting apertures may be defined by the first medial portion 300 of the rear support 102 and/or by the first medial portion 400 of the front support 104. One or more mounting fasteners 702 (e.g., bolts, etc.) may be positioned within one or more of the mounting apertures. The mounting fasteners 702 are configured to mount the bracket 100 to the mounting surface.

Figure 9:
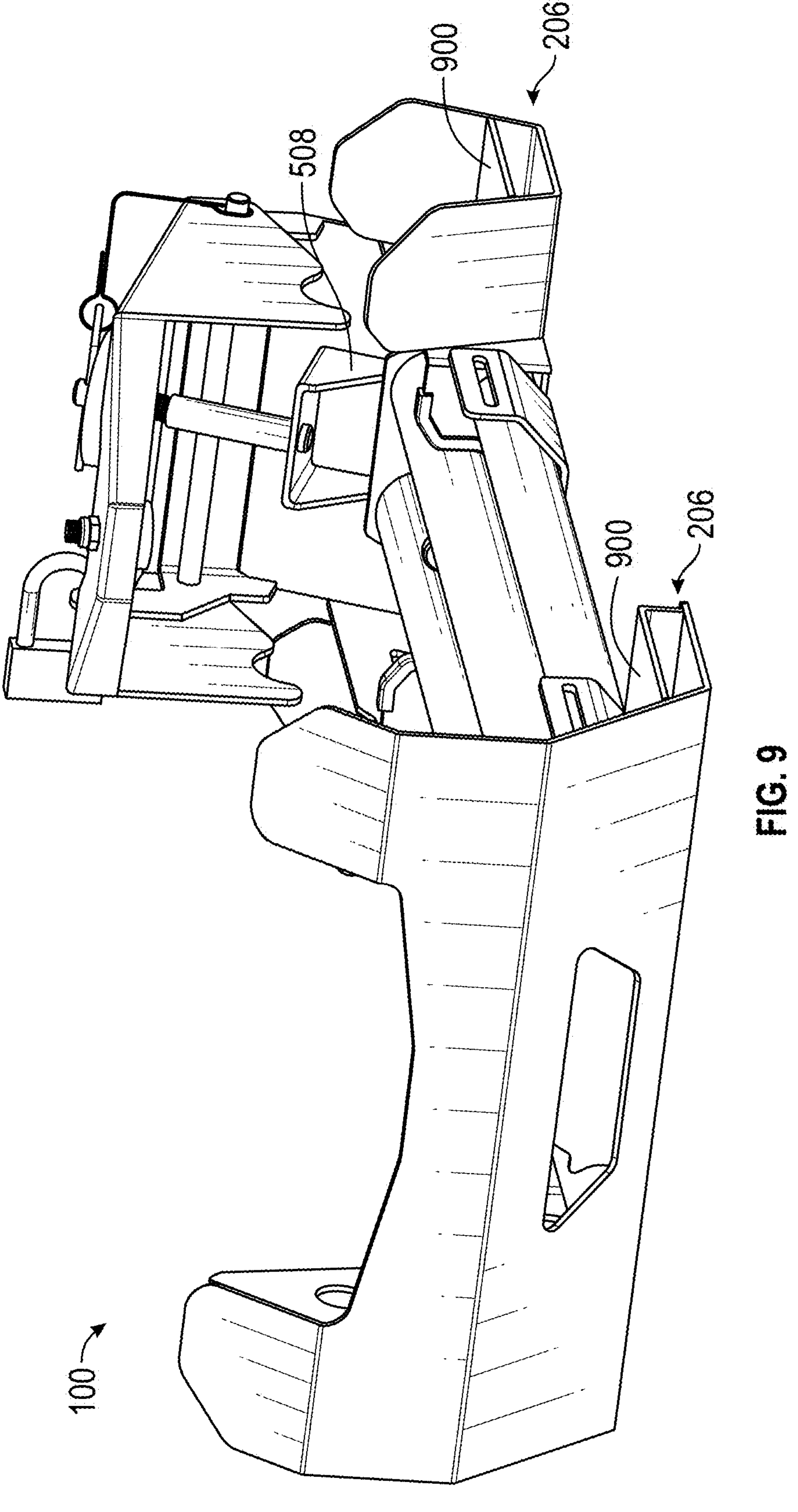
FIG. 9 is a perspective view of a second end of a bracket for securing a vehicle jack according to another embodiment.

Referring now to FIG. 9, a bracket 100 with a locking mechanism is shown according to another exemplary embodiment. The embodiment shown in FIG. 9 is similar to the embodiment shown in FIG. 7-8, except in FIG. 9 the riser 500 does not include a bent portion 700. Rather the riser 500 is straight, and the threaded portion of the riser is positioned at the appropriate angle by the mount 508. The mount 508 is coupled to the third medial portion 404 and positions the riser 500 at an angle such that the riser 500 may pass through the aperture 604. As also shown in FIG. 9, the front wheel wells 206 may include intermediate flanges 900 which raise the bottom of the front wheel wells 206 to accommodate vehicle jacks 200 with smaller front wheels 208.

Figure 10:
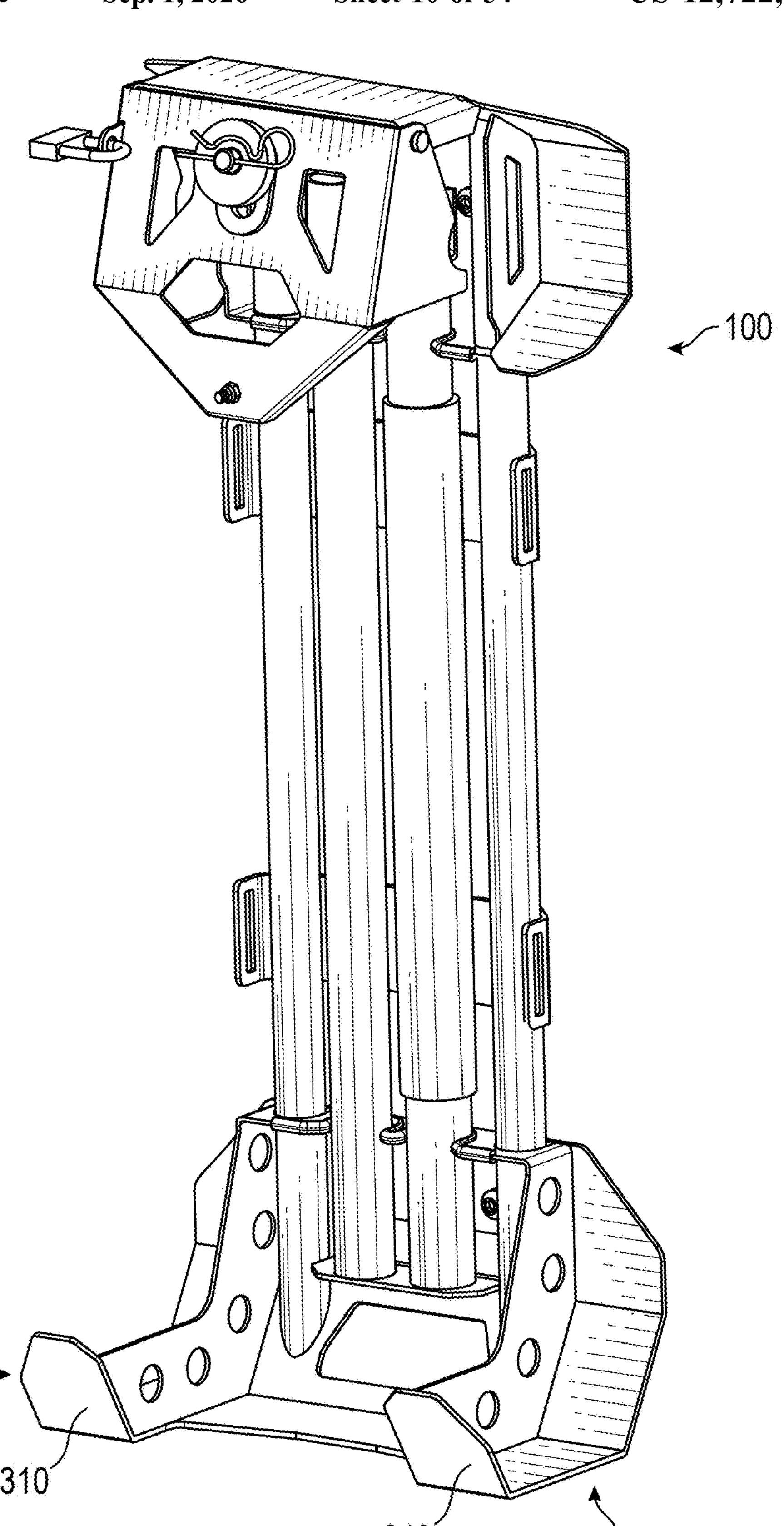
FIG. 10 is a perspective view of the bracket of FIG. 1 in a vertical orientation.
Figure 11:
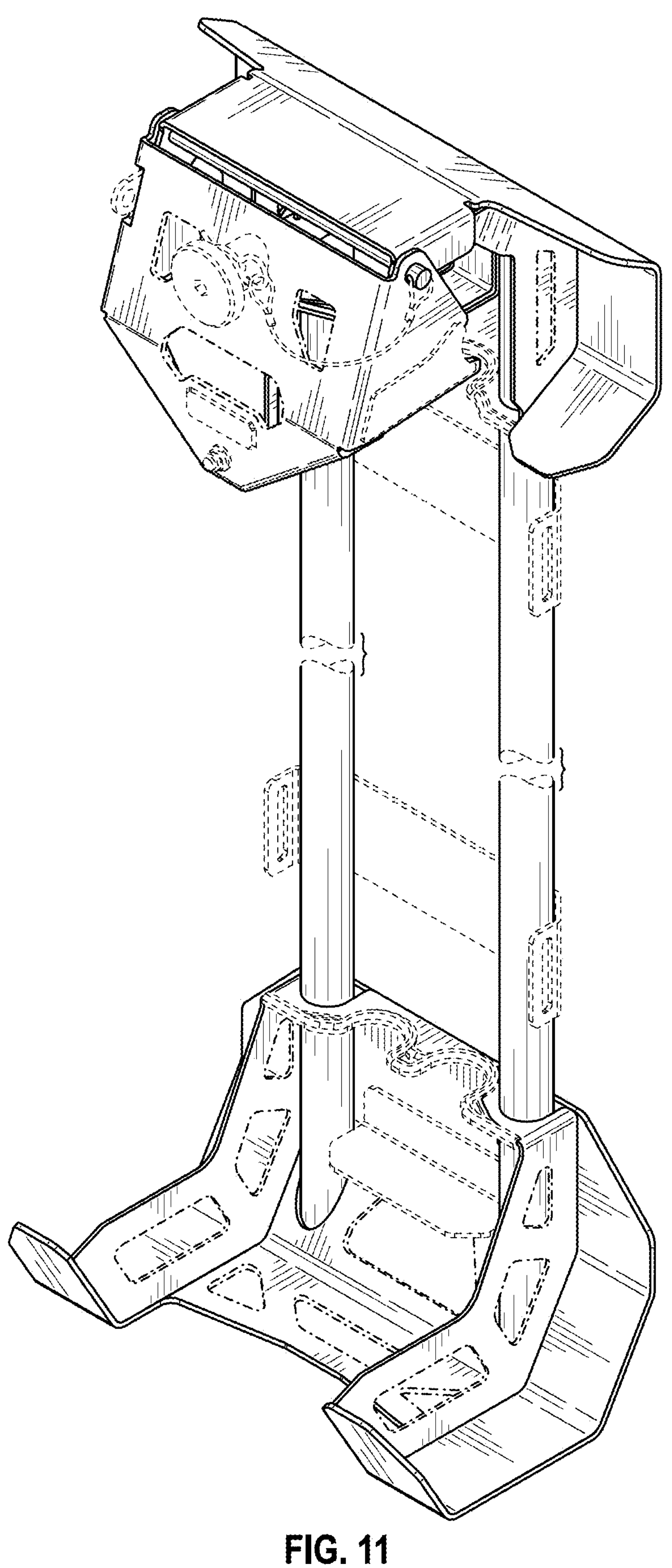
FIG. 11 is a front perspective view from above of a bracket for securing a vehicle jack according to an embodiment.
Figures 12, 13:
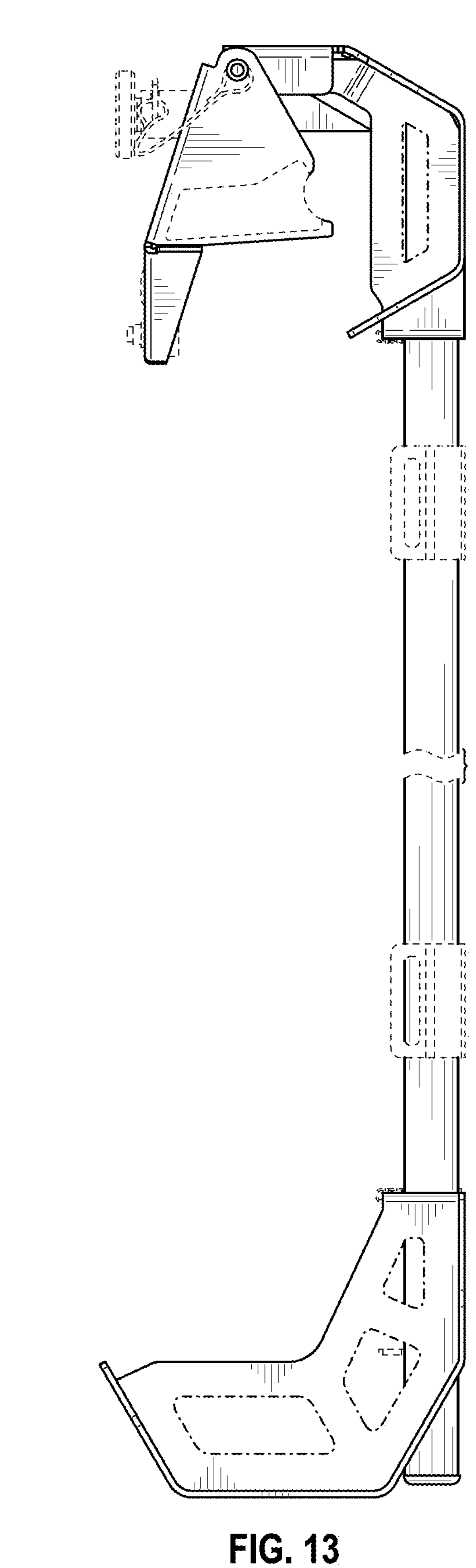
FIG. 12 is a left side view of the bracket of FIG. 11.
FIG. 13 is a right side view of the bracket of FIG. 11.
Figure 14:
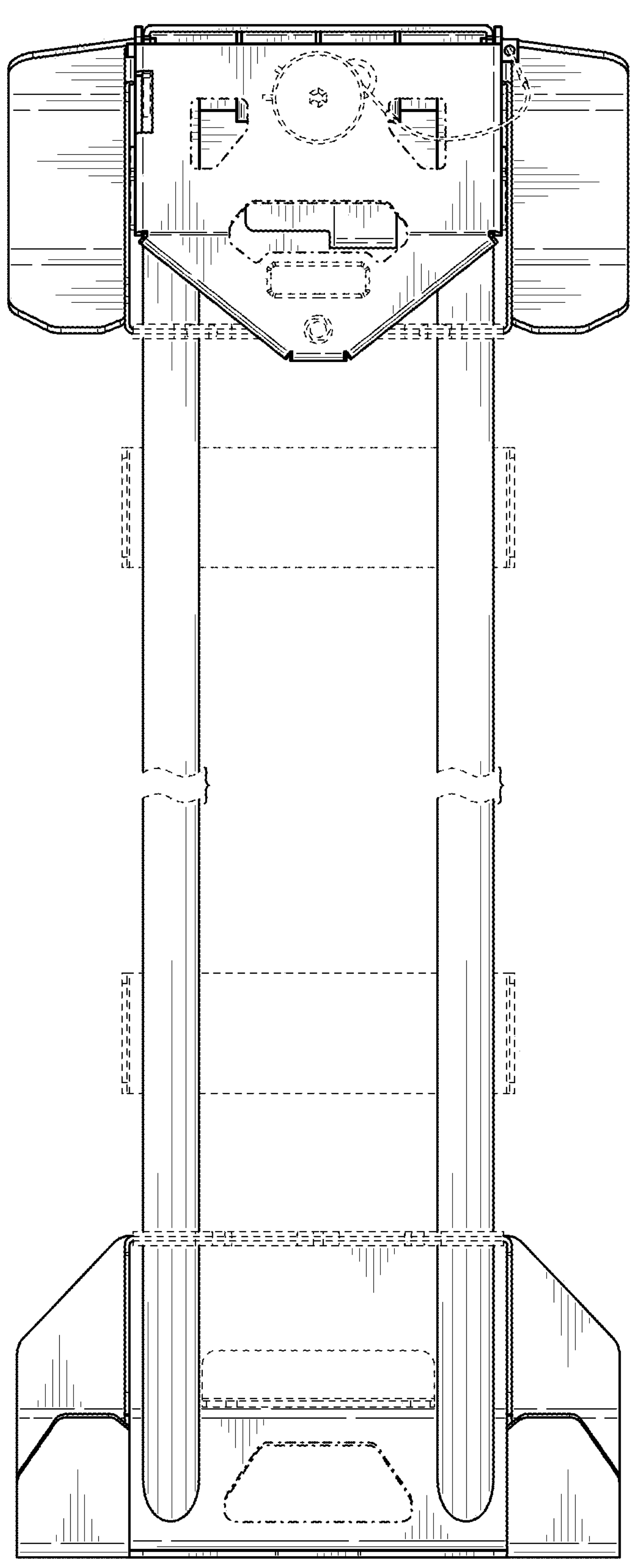
FIG. 14 is a front view of the bracket of FIG. 11.
Figure 15:
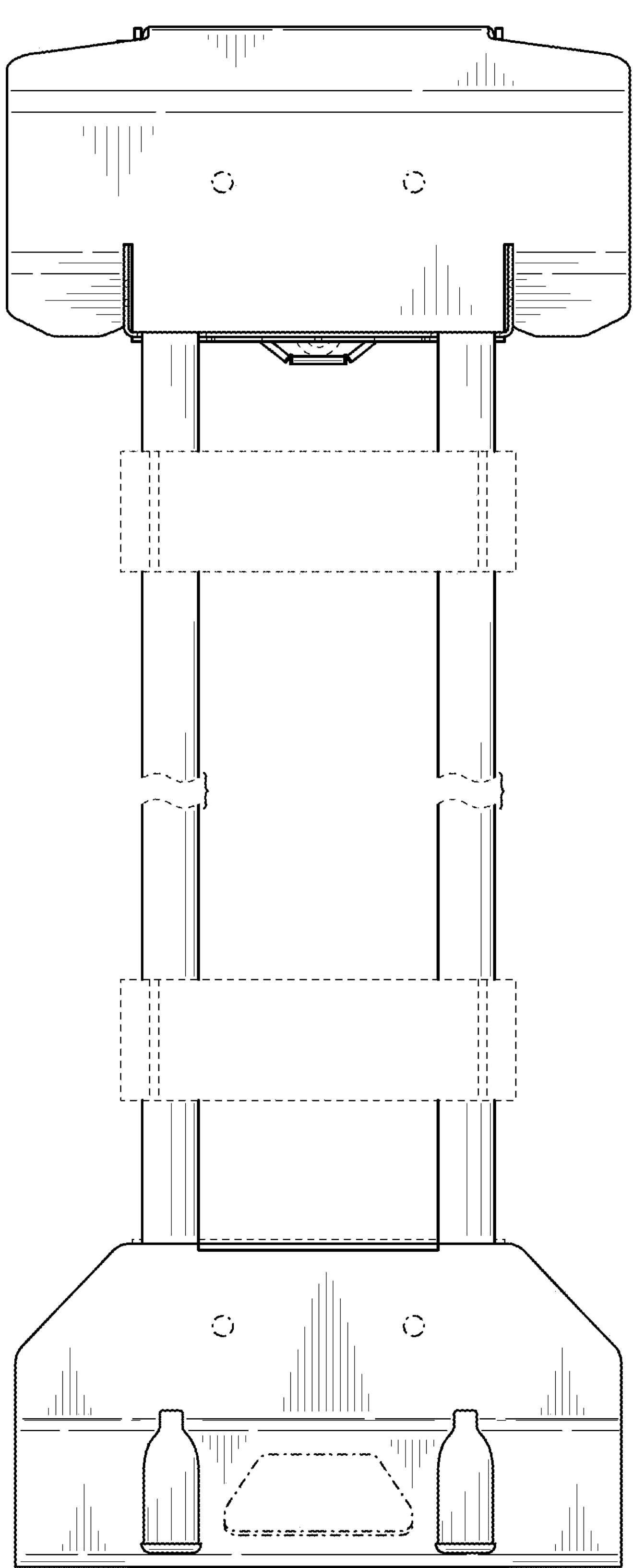
FIG. 15 is a rear view of the bracket of FIG. 11.
Figure 16:
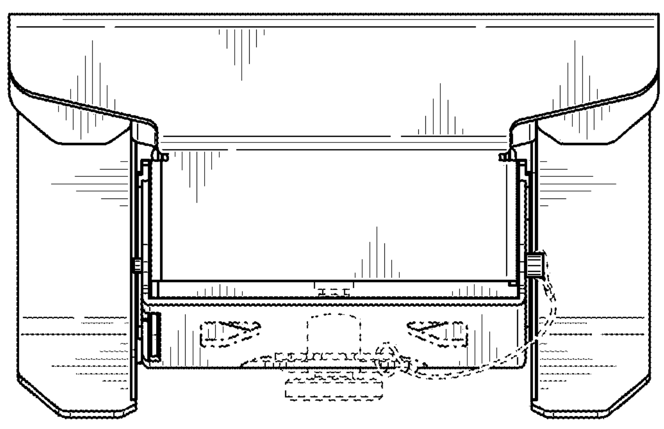
FIG. 16 is a top view of the bracket of FIG. 11.
Figure 17:
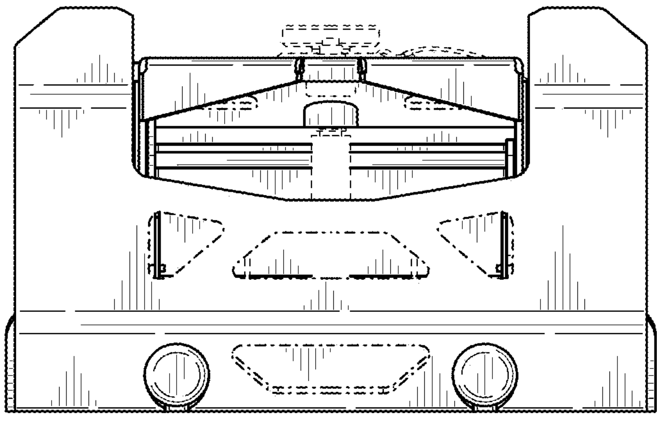
FIG. 17 is a bottom view of the bracket of FIG. 11.
Figure 18:
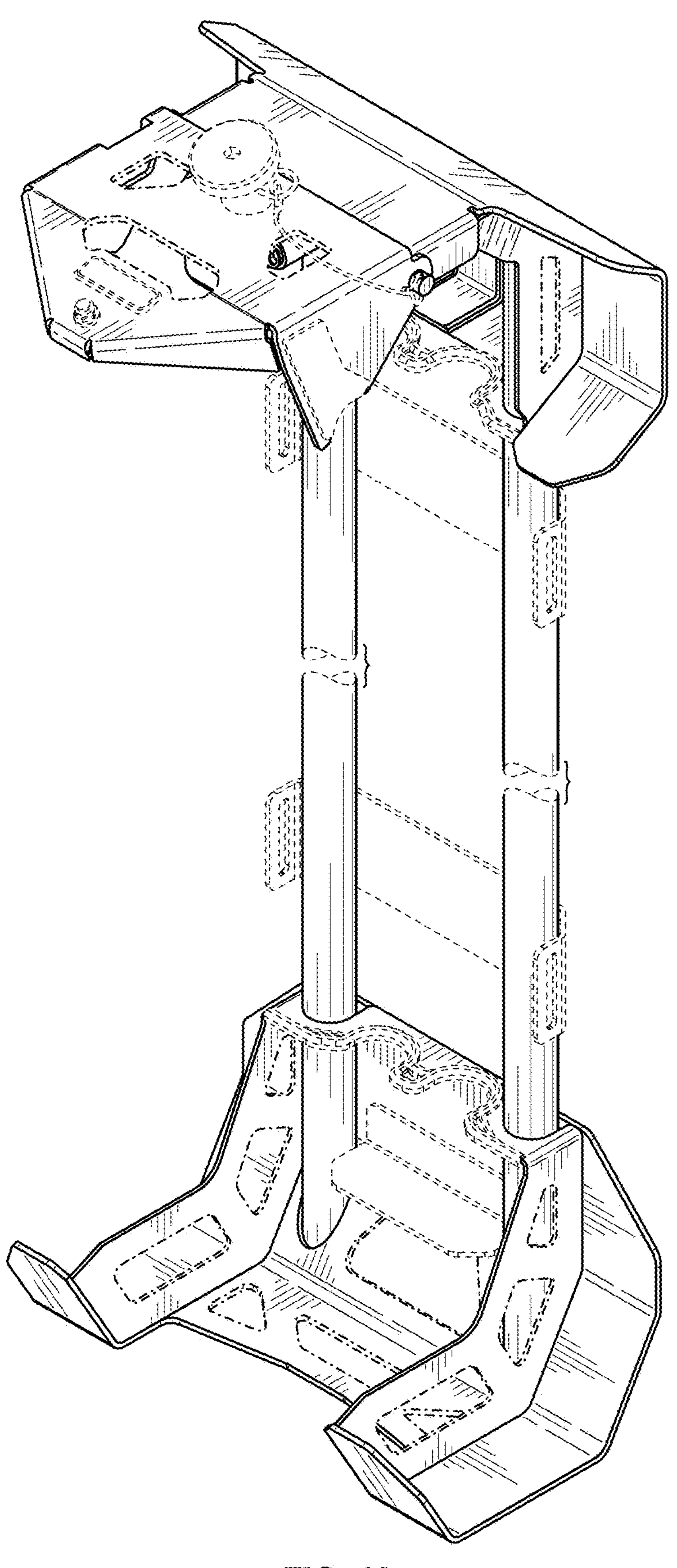
FIG. 18 is a front perspective view of the bracket of FIG. 11 in a second position.
Figure 19:
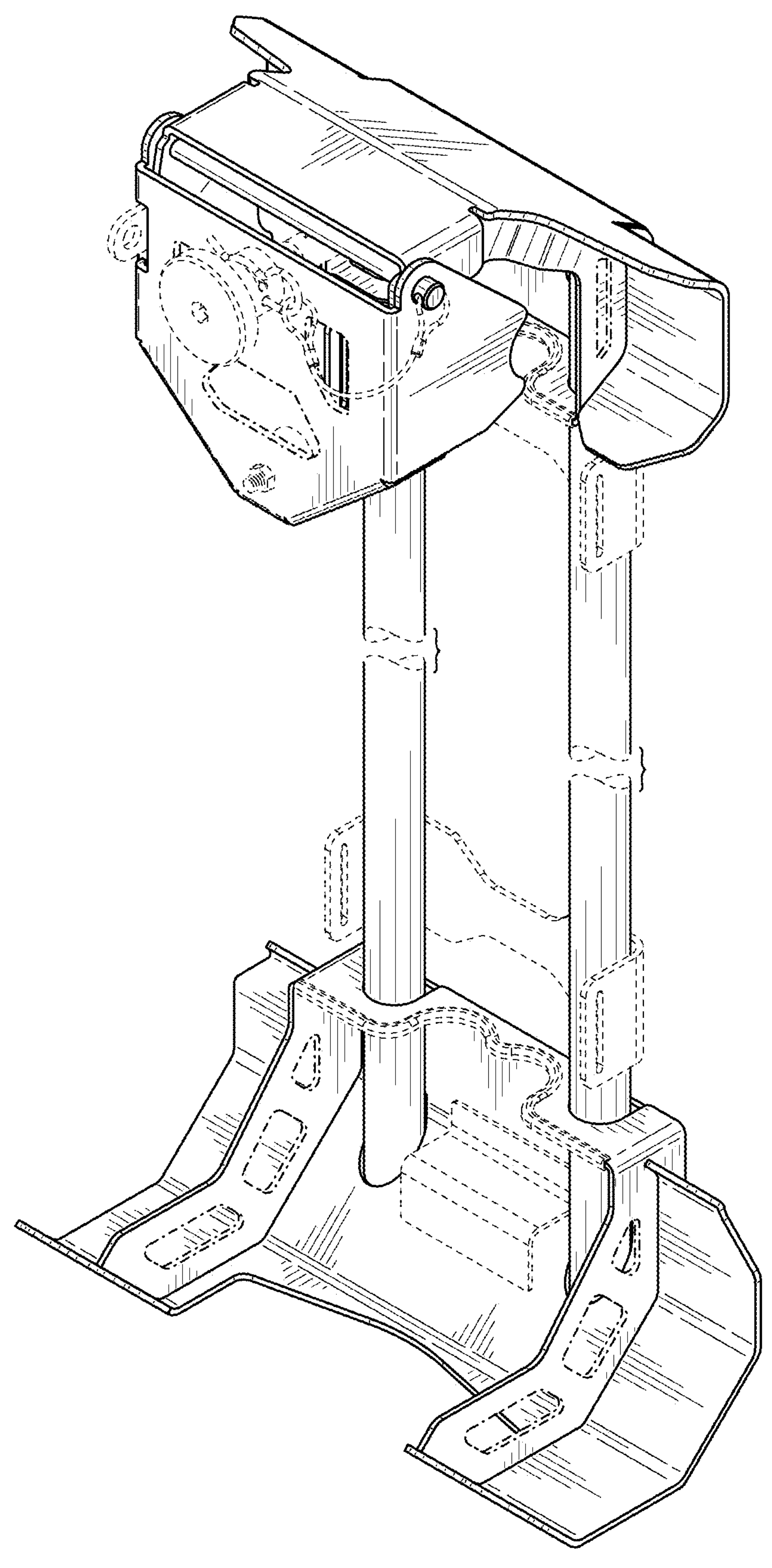
FIG. 19 is a front perspective view from above of a bracket for securing a vehicle jack according to another embodiment.
Figures 20, 21:
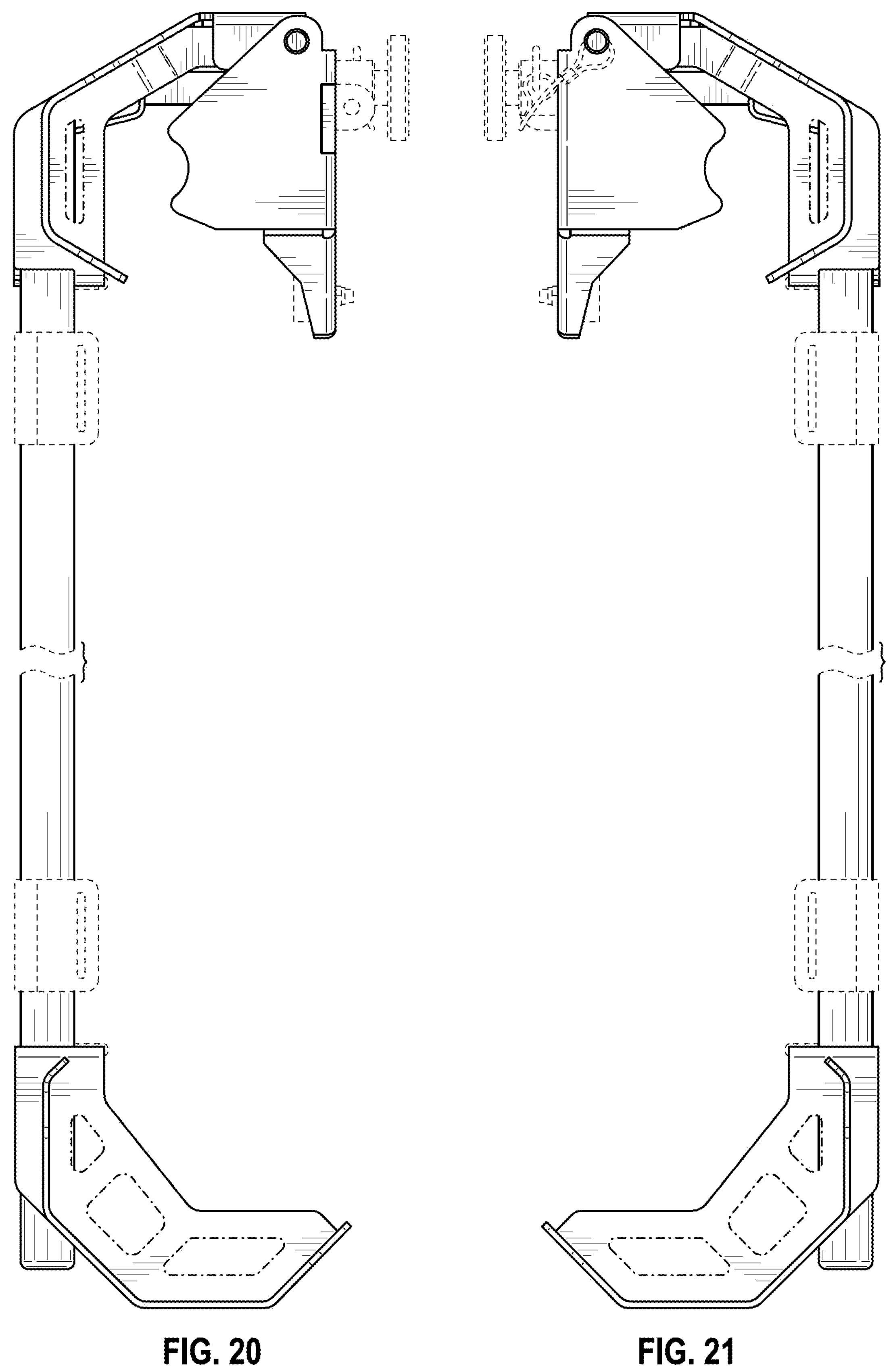
FIG. 20 is a left side view of the bracket of FIG. 19.
FIG. 21 is a right side view of the bracket of FIG. 19.
Figure 22:
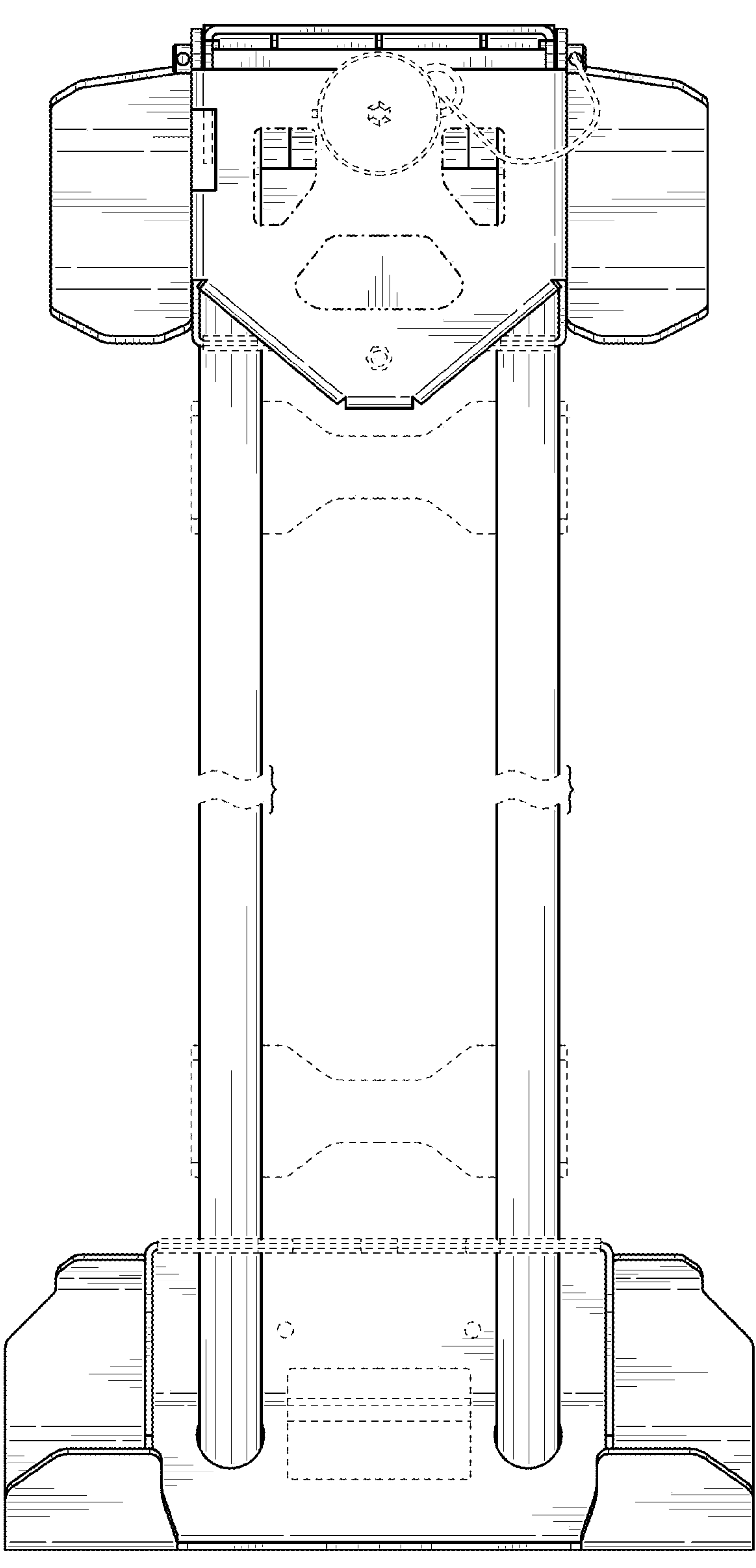
FIG. 22 is a front view of the bracket of FIG. 19.
Figure 23:
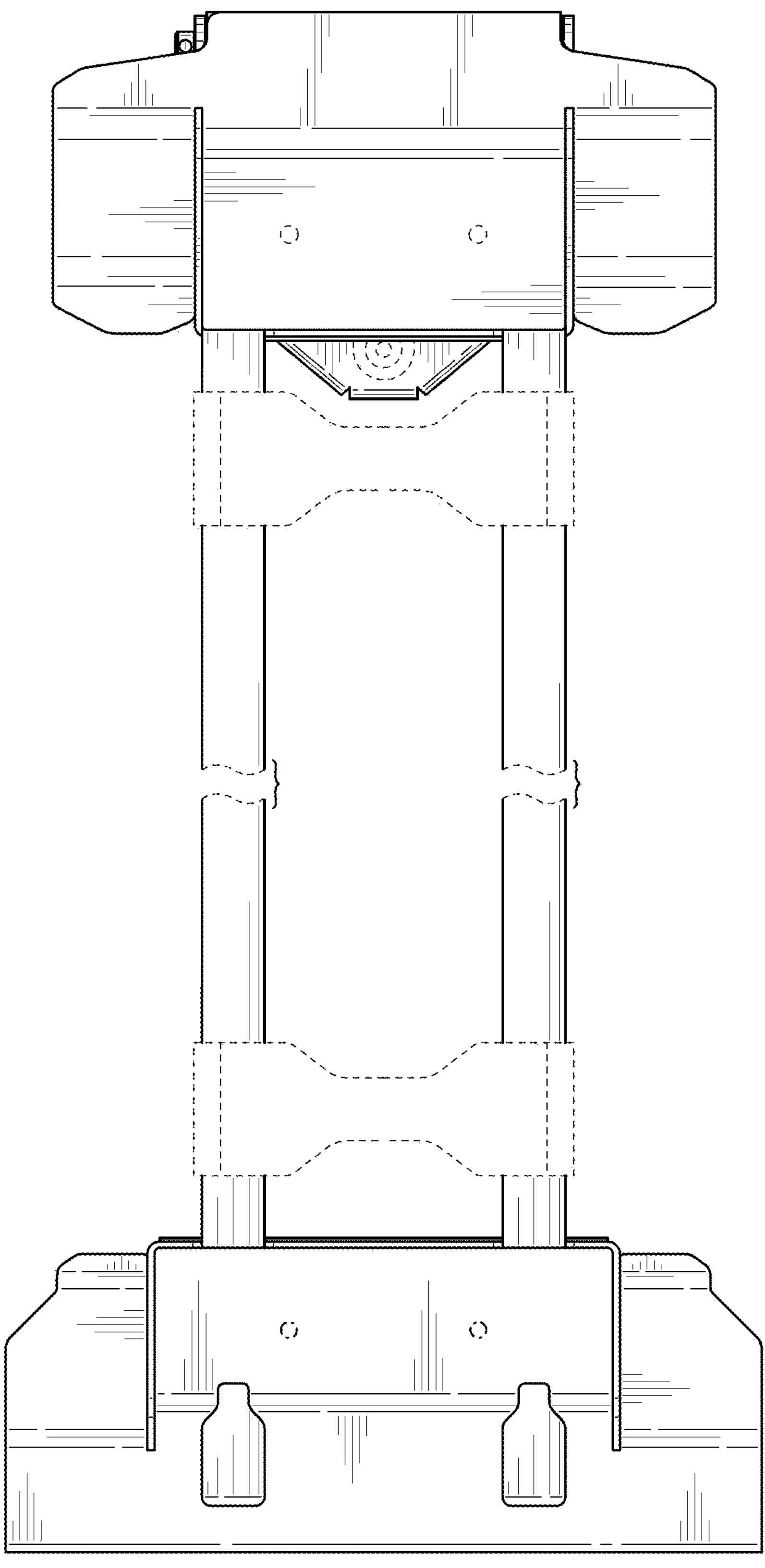
FIG. 23 is a rear view of the bracket of FIG. 19.
Figure 24:
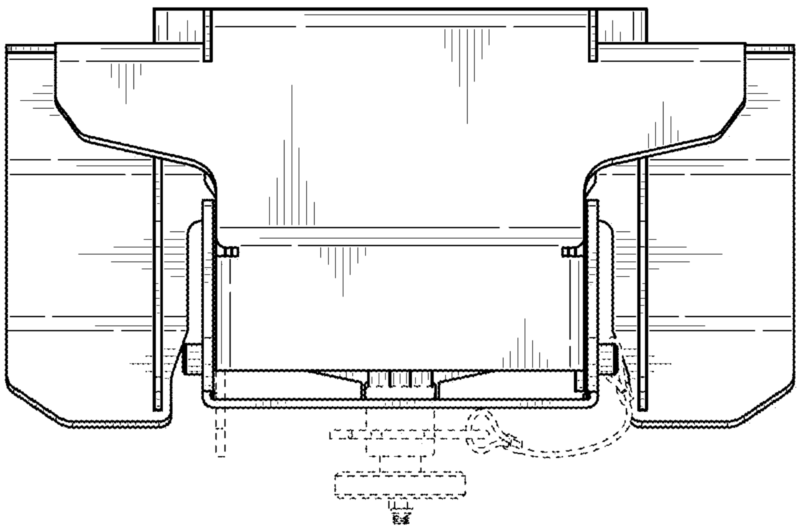
FIG. 24 is a top view of the bracket of FIG. 19.
Figure 25:
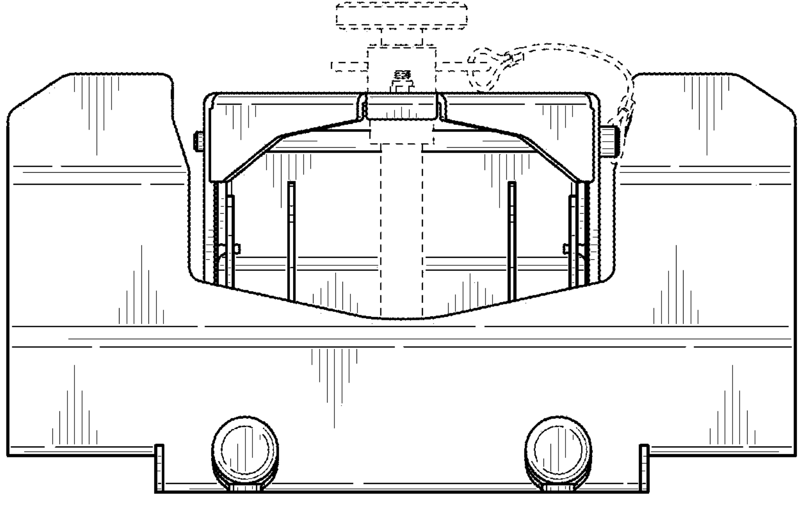
FIG. 25 is a bottom view of the bracket of FIG. 19.
Figure 26:
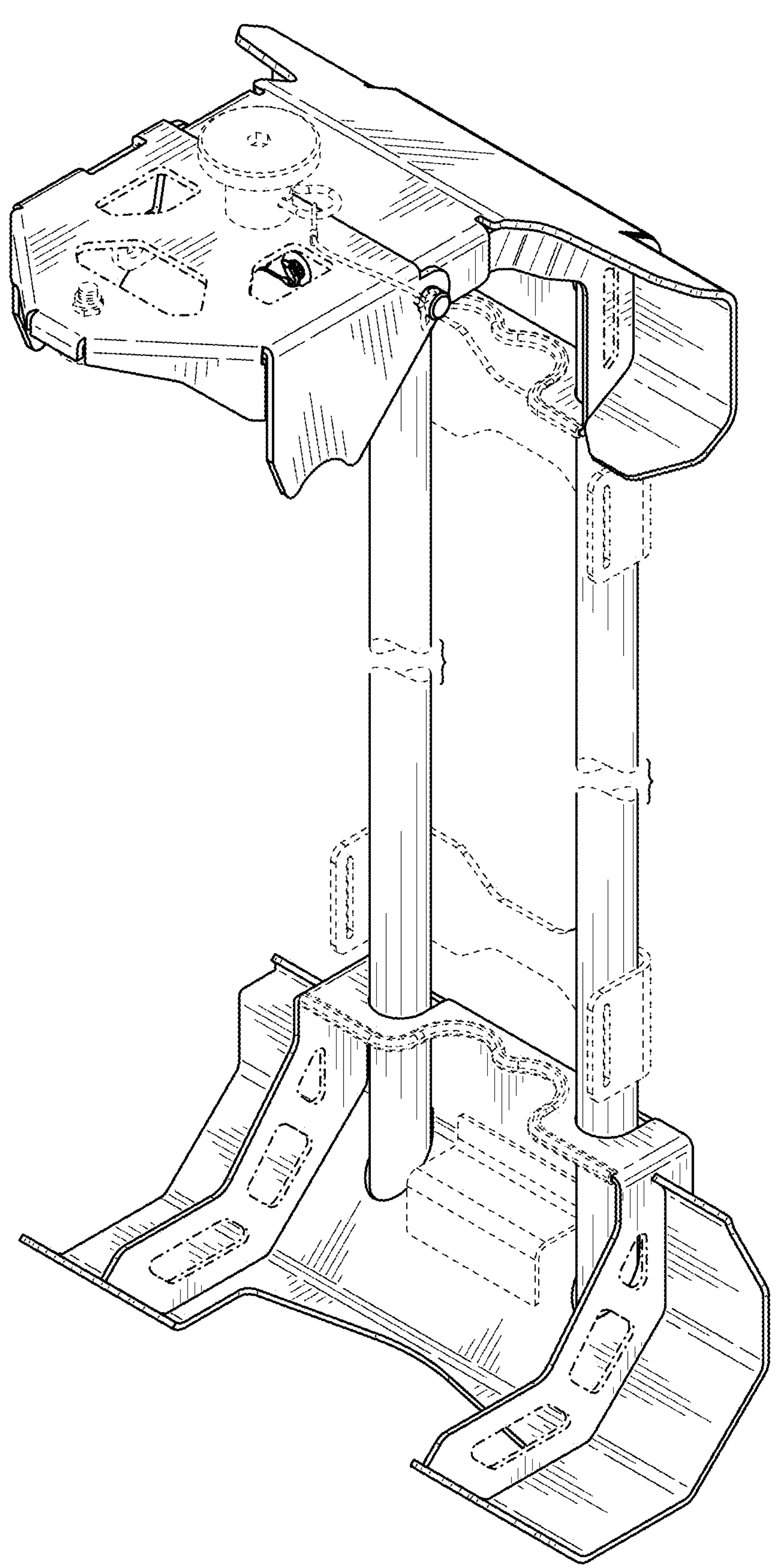
FIG. 26 is a front perspective view of the bracket of FIG. 19 in a second position.
Figure 27:
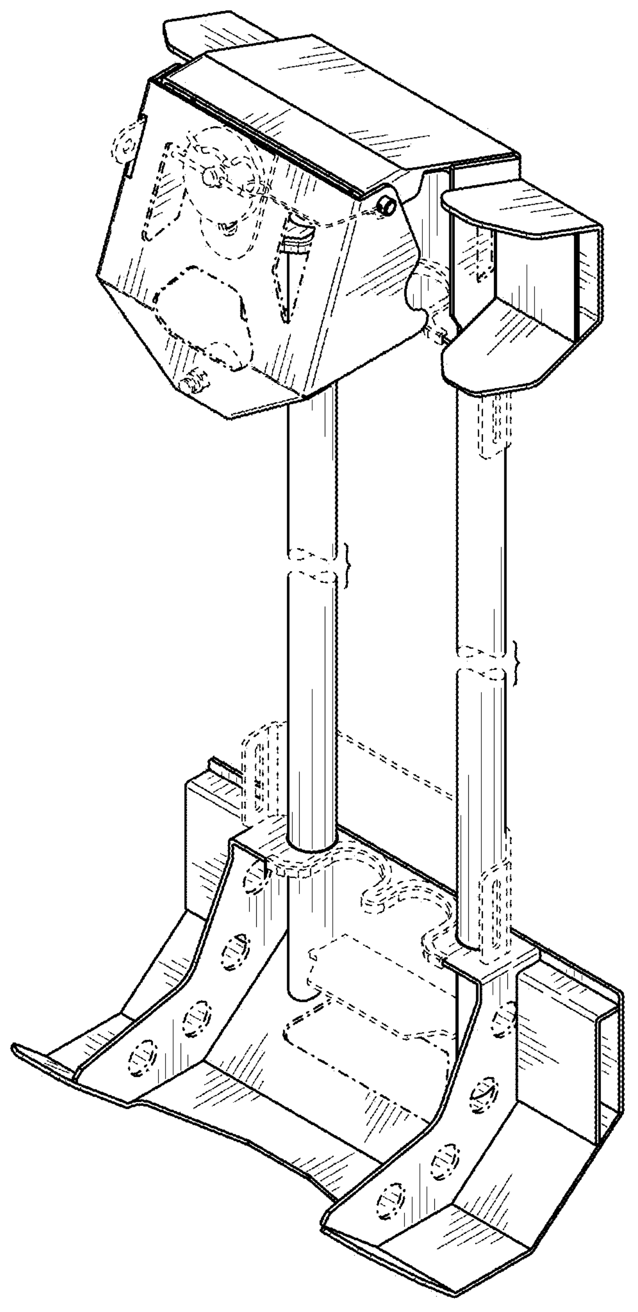
FIG. 27 is a front perspective view from above of a bracket for securing a vehicle jack according to another embodiment.
Figures 28, 29:
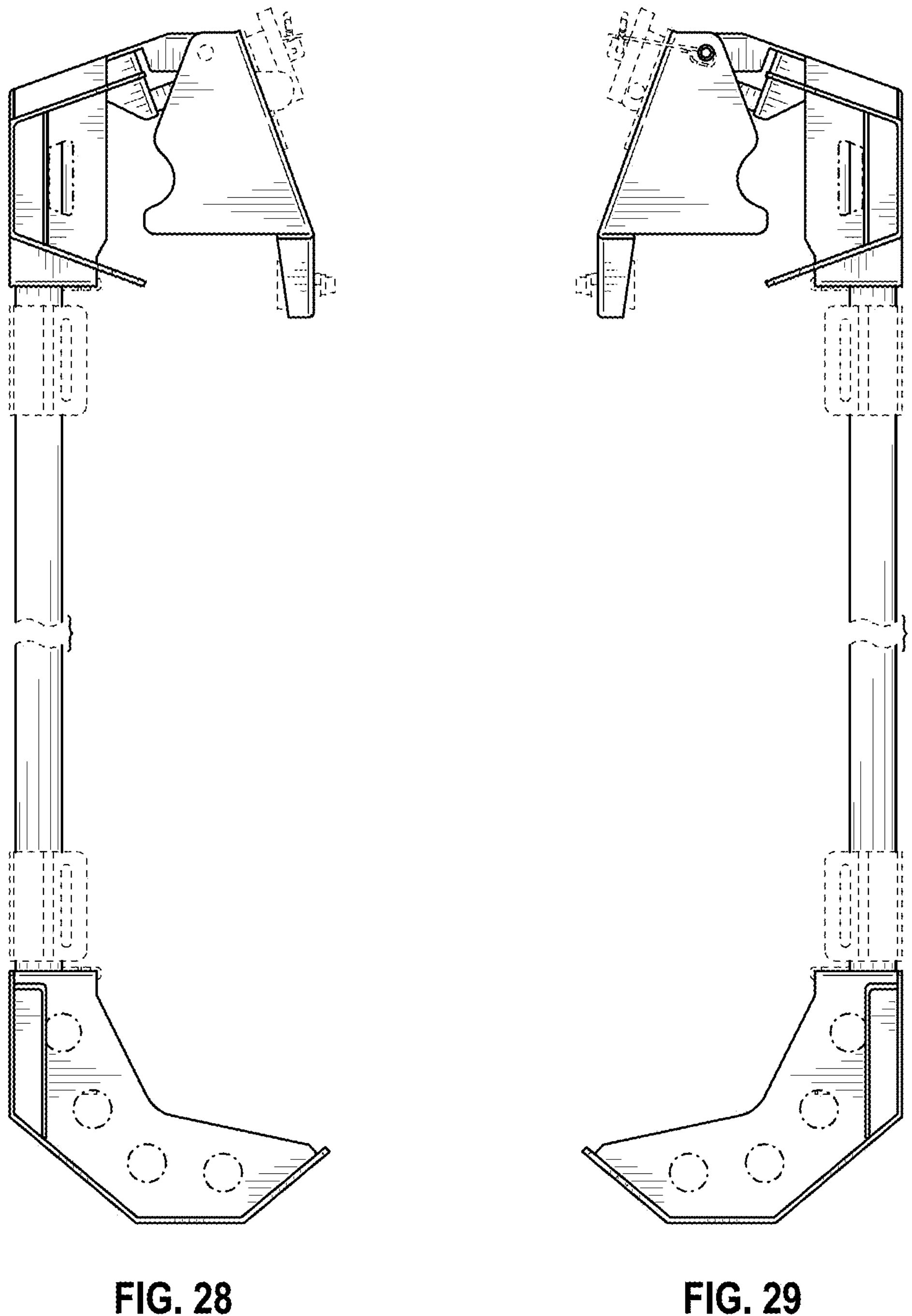
FIG. 28 is a left side view of the bracket of FIG. 27.
FIG. 29 is a right side view of the bracket of FIG. 27.
Figure 30:
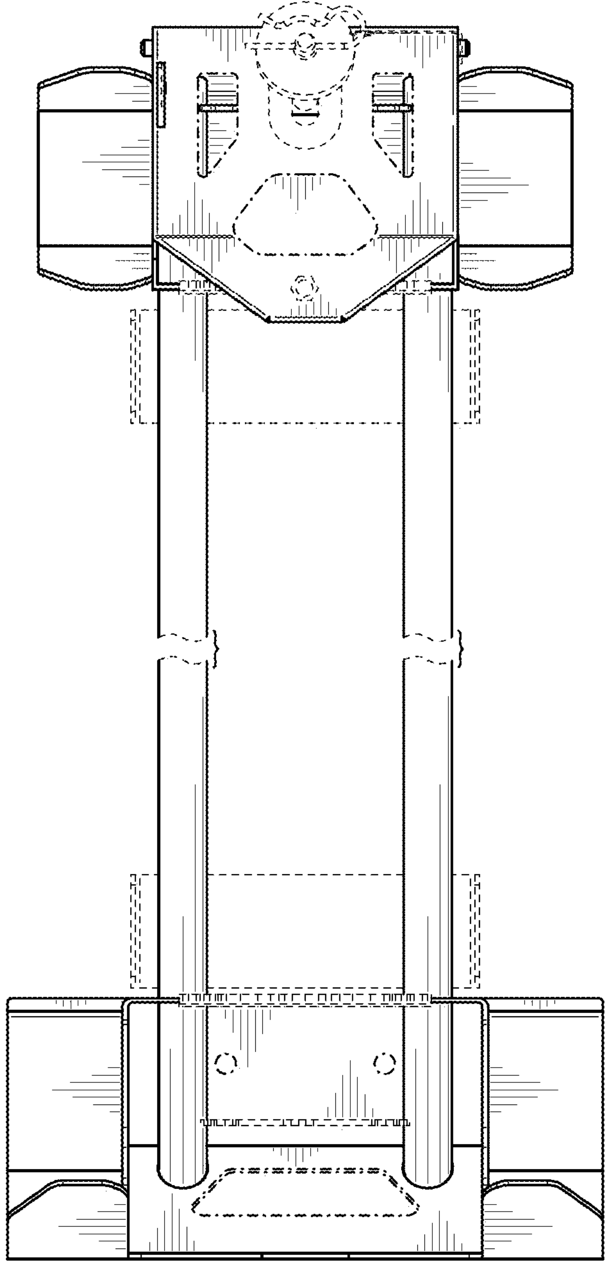
FIG. 30 is a front view of the bracket of FIG. 27.
Figure 31:
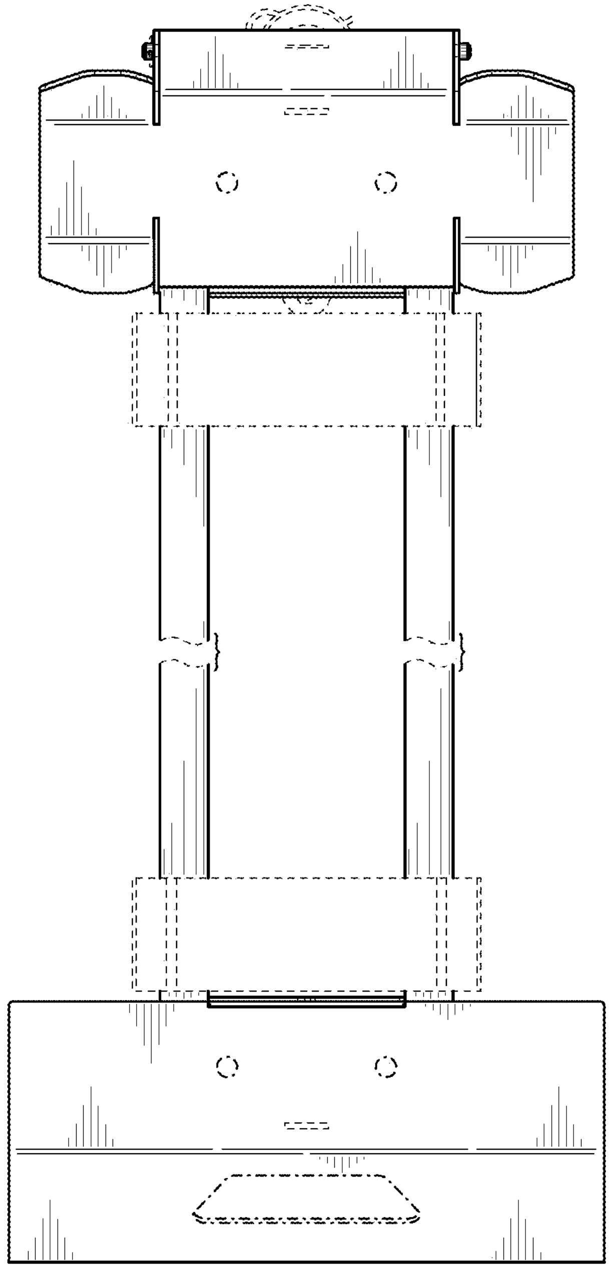
FIG. 31 is a rear view of the bracket of FIG. 27.
Figure 32:
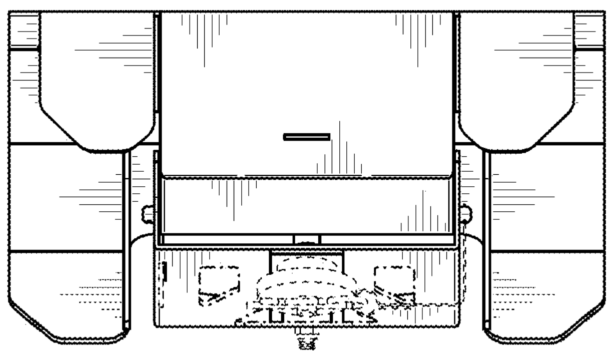
FIG. 32 is a top view of the bracket of FIG. 27.
Figure 33:
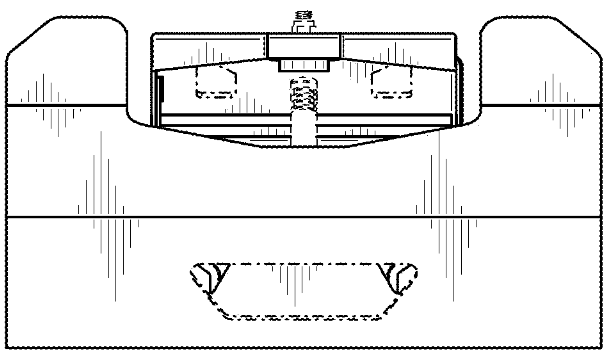
FIG. 33 is a bottom view of the bracket of FIG. 27.
Figure 34:
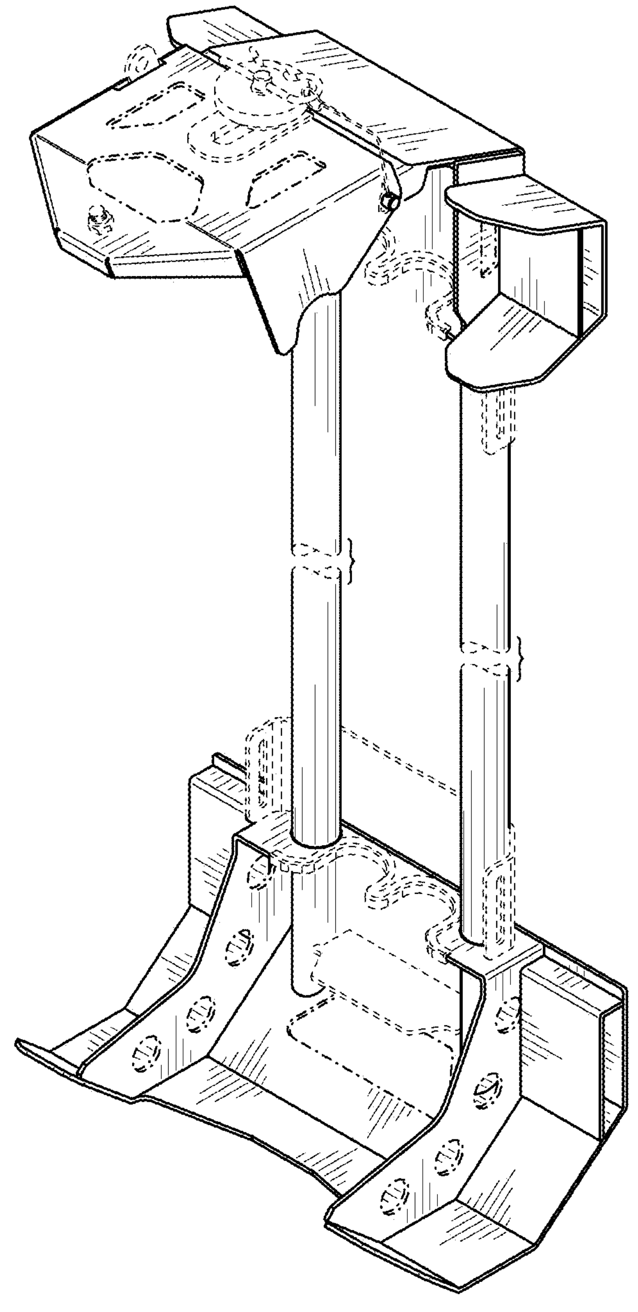
FIG. 34 is a front perspective view from above of a bracket for securing a vehicle jack according to another embodiment.
Figure 35:
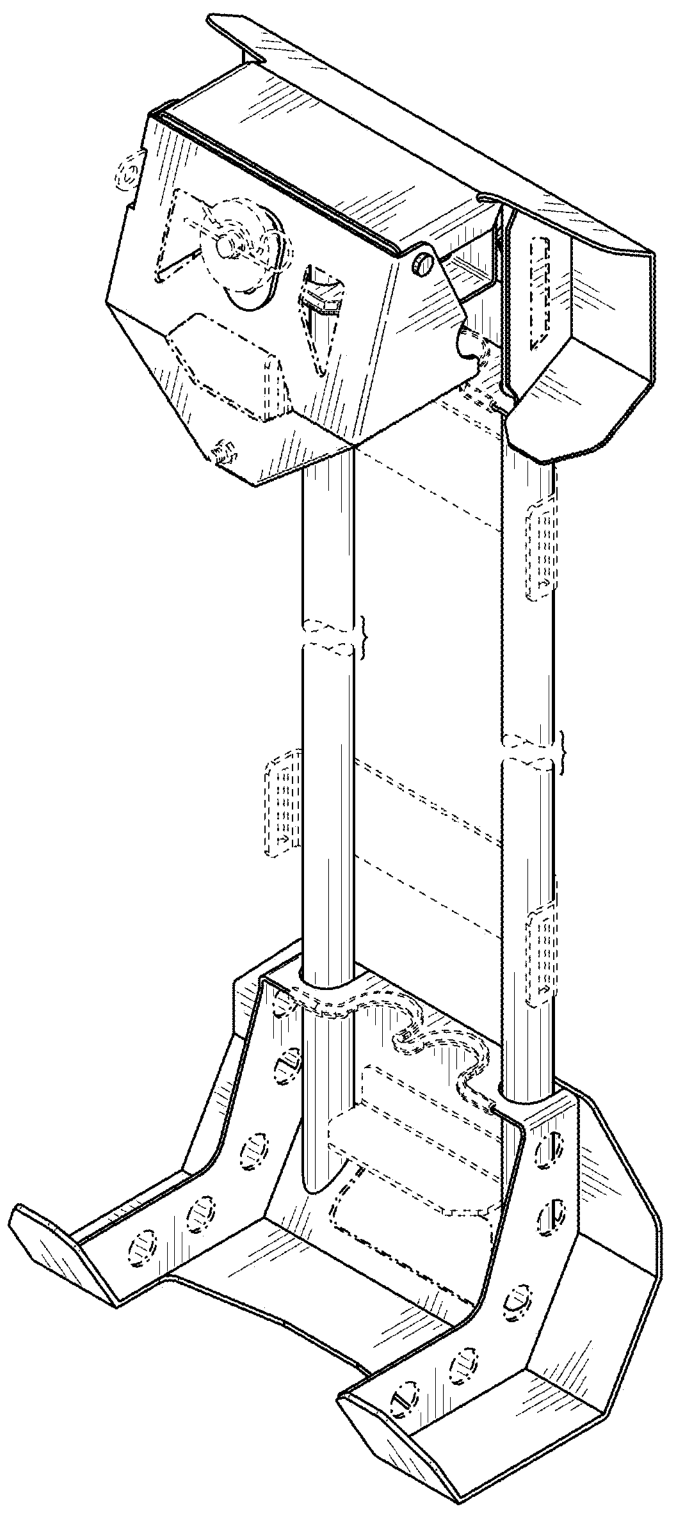
FIG. 35 is a front perspective view from above of a bracket for securing a vehicle jack according to another embodiment.
Figures 36, 37:
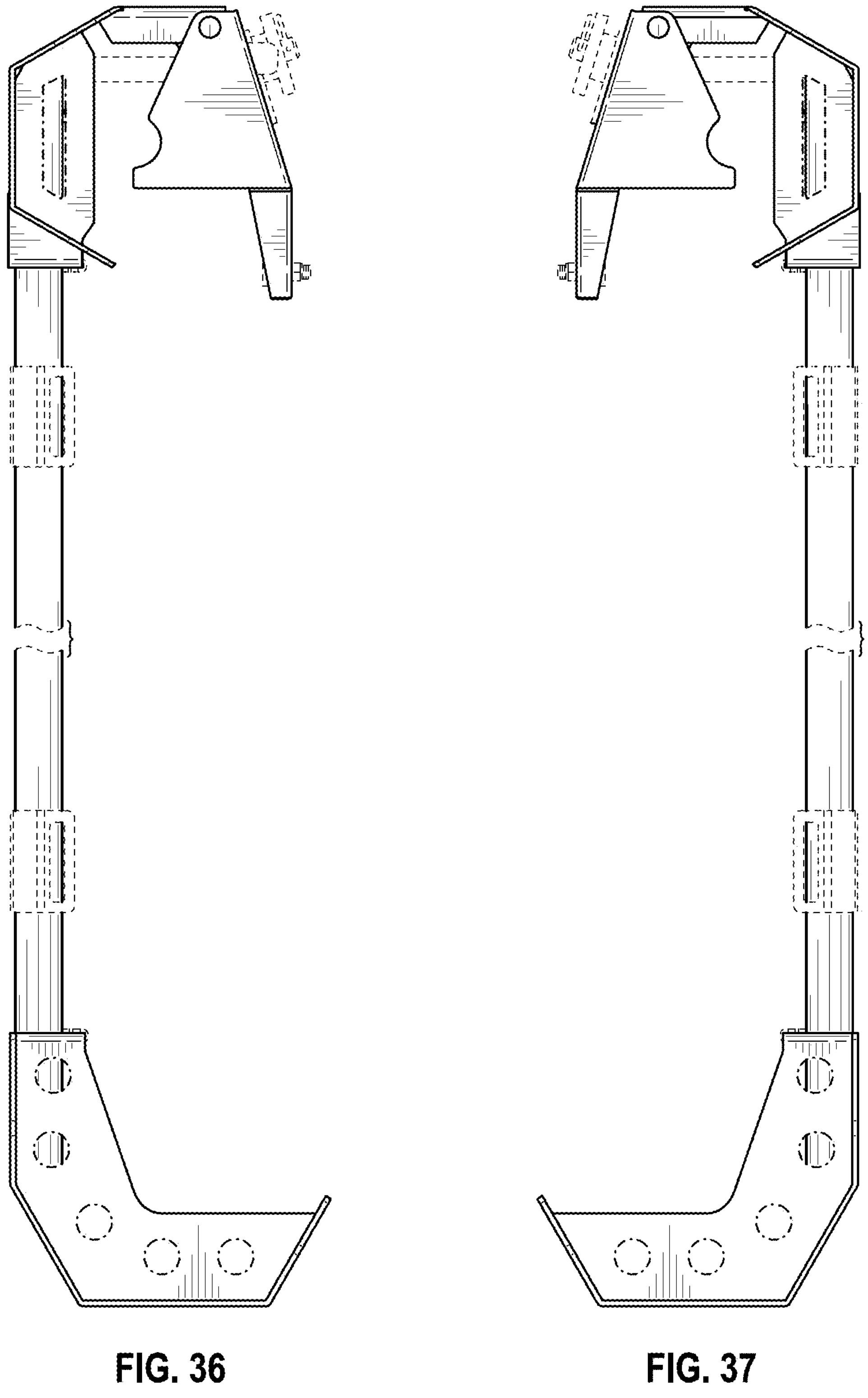
FIG. 36 is a left side view of the bracket of FIG. 35.
FIG. 37 is a right side view of the bracket of FIG. 35.
Figure 38:
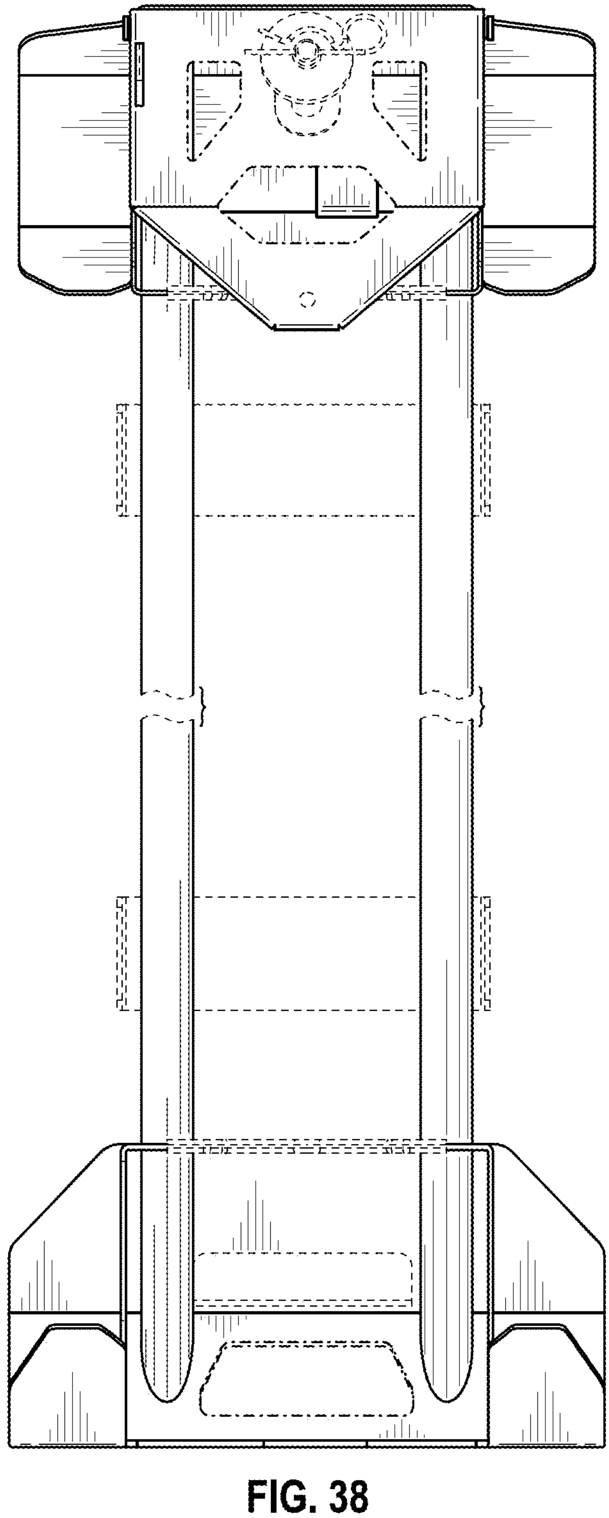
FIG. 38 is a front view of the bracket of FIG. 35.
Figure 39:
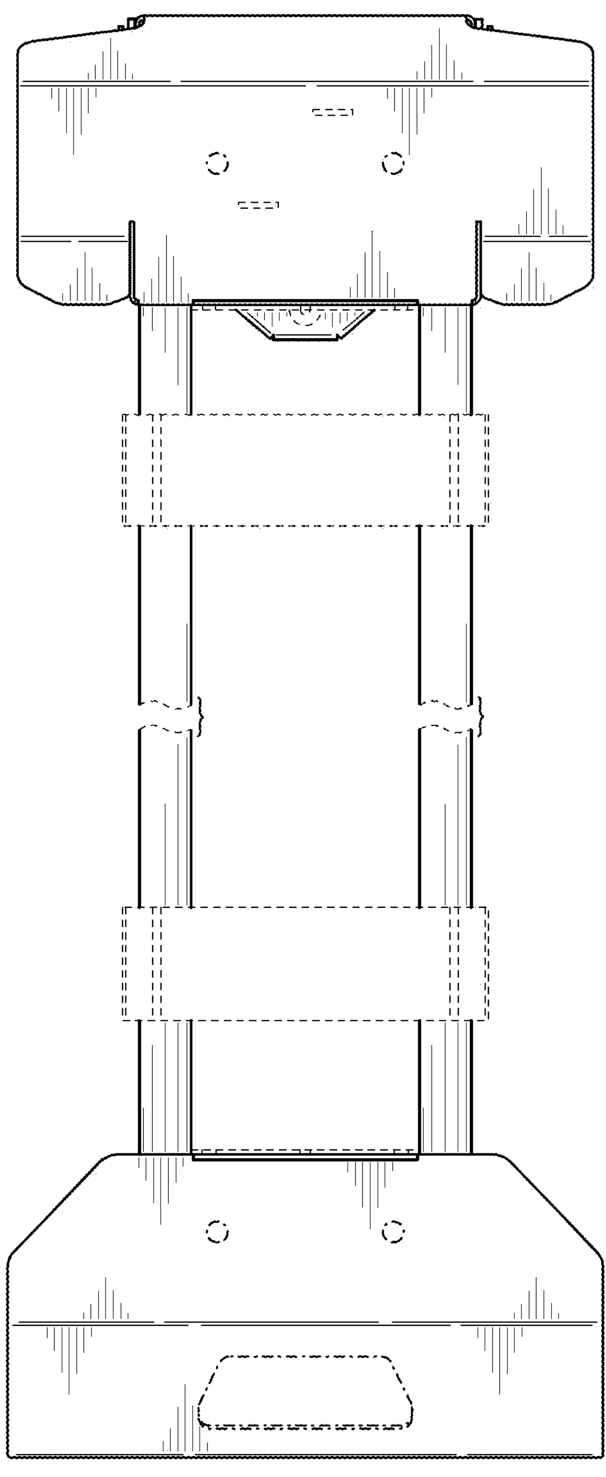
FIG. 39 is a rear view of the bracket of FIG. 35.
Figure 40:
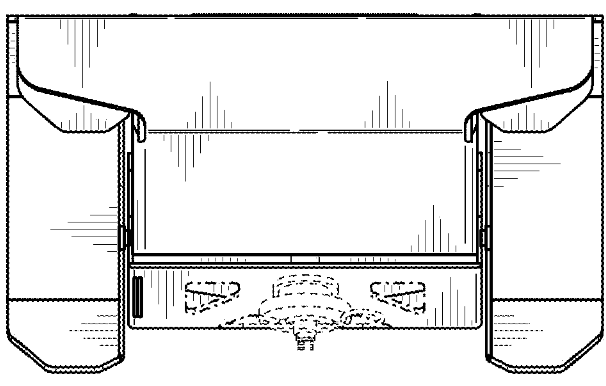
FIG. 40 is a top view of the bracket of FIG. 35.
Figure 41:
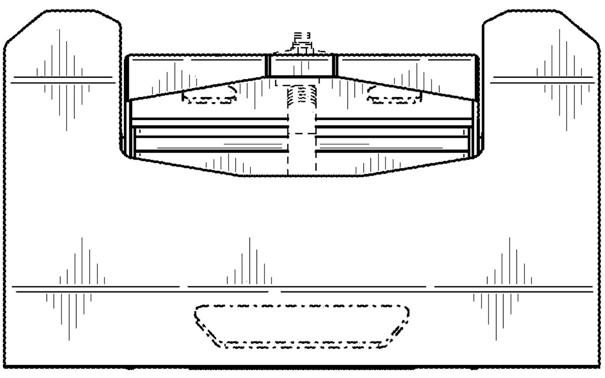
FIG. 41 is a bottom view of the bracket of FIG. 35.
Figure 42:
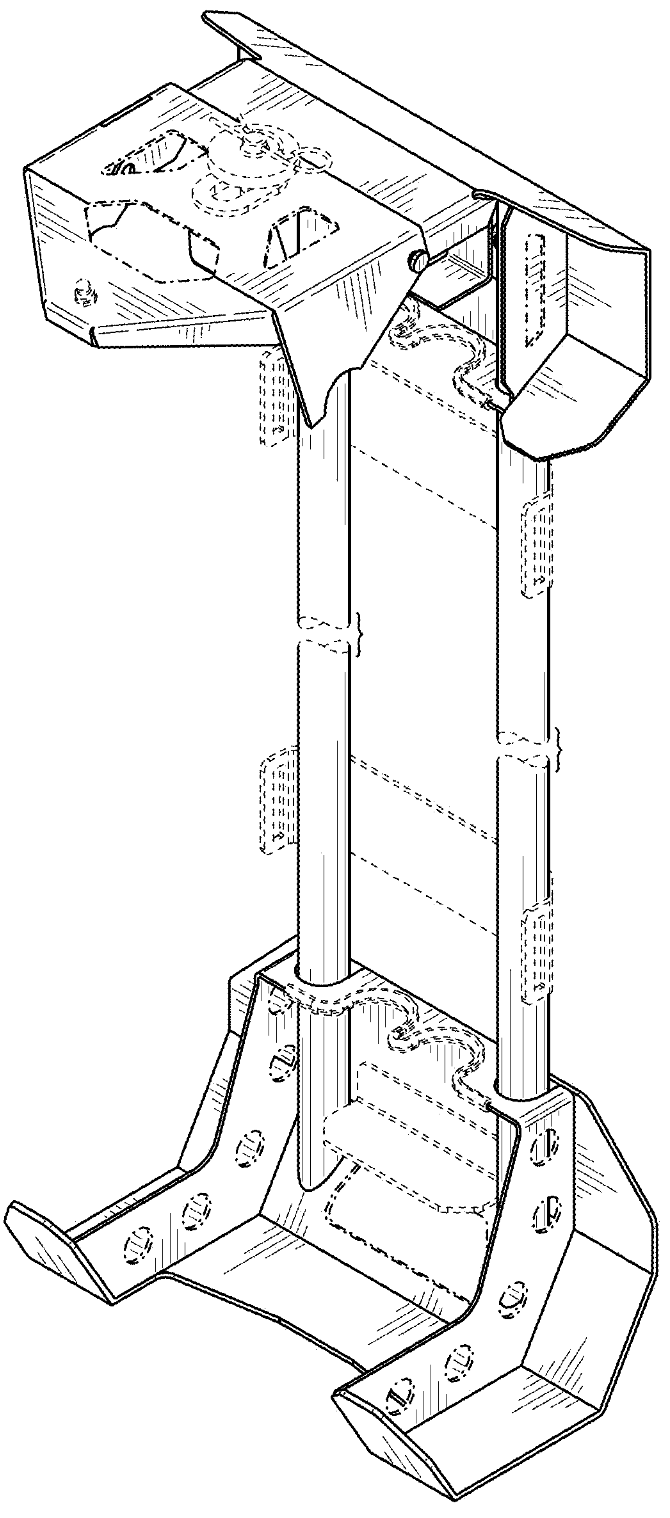
FIG. 42 is a front perspective view of the bracket of FIG. 35 in a second position.

Referring now to FIG. 10, the bracket 100 is shown in a vertical mounting orientation. In the vertical mounting orientation, the bracket 100 may be mounted vertically or substantially vertically on the mounting surface (e.g., a receiving surface, a vehicle, a truck bed, a wall, etc.). In some embodiments, the rear wheel wells 202 may be configured as feet of the bracket 100 and may at least partially support or allow the bracket 100 to be positioned in a standing arrangement (e.g., without being mounted to the mounting surface). In the vertical mounting orientation, the bracket 100 is mounted such that the rear wheel wells 202 are at the bottom. The top flanges 310 of the rear wheel wells 202 prevent the rear wheels 204 from rolling out of the rear wheel wells 202.

FIG. 11-41 show views of various embodiments of the bracket 100 in both a storage and an open position.

Configuration of Exemplary Embodiments

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

Referring to FIG. 11-41, any portion of the article depicted in broken lines forms no part of the claimed design. Broken lines formed by equal length dashes show unclaimed portions of the design. Broken lines formed of unequal length dashes (i.e., dash-dot) show boundaries between claimed and unclaimed portions of the design. Broken lines having a jagged element show that no particular length of that portion of the article is claimed, such lines and any portion of the article between such lines form no part of the claimed design.

While the accompanying drawings described above illustrate one or more exemplary embodiments, it should be understood that according to other exemplary embodiments that should be considered to be within the possession of the inventors of the present application at the time this application is being filed, it is contemplated that any illustrated solid lines (or portions thereof) may be converted to broken lines and that any illustrated broken lines (or portions thereof) may be converted to solid lines so as to claim or disclaim portions, components, or sub-components of the designs shown. It is further contemplated that shading may be added or removed to claim or disclaim the corresponding surfaces.

What is claimed is:

1. A bracket for a vehicle jack, comprising:

a first support comprising a first pair of wheel wells;

a second support coupled to the first support by one or more longitudinal members, the second support comprising a second pair of wheel wells;

a cover rotatably coupled to the second support and moveable between a storage position and an open position, wherein the cover includes an aperture; and a locking mechanism configured to releasably secure the cover in the storage position, the locking mechanism comprising:

a riser extending from the second support and positioned laterally between the second pair of wheel wells; and a cap rotatably coupled to the cover and configured to releasably couple to the riser, wherein the aperture receives at least one of the cap or the riser through the cover, such that the cap and riser when releasably coupled restrict rotation of the cover from the storage position to the open position.

2. The bracket of claim 1, wherein the cap is rotatably coupled to the riser such that the cap may rotate relative to the riser.

3. The bracket of claim 2, wherein the cap comprises:

a head with a first diameter;

a shaft configured to pass through the aperture, the aperture having a second diameter less than the first diameter; and a c clip coupled to the shaft on an opposing side of the cover relative to the head, wherein the c clip and the head rotatably couple the cap to the cover, such that the cap rotates relative to the cover to engage the riser and the cap rotates with the cover between the storage position and the open position.

4. The bracket of claim 1, wherein the locking mechanism further comprises a locking pin configured to engage at least one of the cover, the cap, or the riser to prevent the cap from decoupling from the riser.

5. The bracket of claim 4, wherein the cap comprises a shaft configured to pass through the aperture and wherein the locking pin passes through the cover and the shaft to restrict rotation of the cap relative to the cover.

6. The bracket of claim 4, wherein a portion of the riser passes through the aperture and the cap, and wherein the locking pin passes through the portion of the riser passing through the cap to prevent the cap from decoupling from the riser.

7. The bracket of claim 1, wherein the cap is releasably coupled to the riser via threads.

8. The bracket of claim 1, wherein the aperture is an elongated slot to receive the riser.

9. The bracket of claim 1, wherein at least one of the first support or the second support comprises a handle support to receive a piece of a handle of the vehicle jack.

10. The bracket of claim 9, wherein the handle support positions the piece of the handle at a position substantially aligned with at least one of the first pair of wheel wells or the second pair of wheel wells.

11. The bracket of claim 1, wherein at least a portion of the first pair of wheel wells extend at least partially above an axle height of a wheel for the vehicle jack.

12. A vehicle jack mounting system, comprising:

a bracket, comprising:

one or more longitudinal members positioned along a longitudinal axis of the bracket;

a rear support coupled to a first end of the one or more longitudinal members, the rear support comprising a plurality of rear wheel wells;

a front support coupled to a second end of the one or more longitudinal members opposite the first end, the front support comprising a plurality of front wheel wells;

one or more handle supports coupled to at least one of the rear support or the front support;

a cover rotatably coupled to the front support and moveable between a first position and a second position different than the first position; and a locking mechanism configured to releasably secure the cover in at least one of the first position or the second position, the locking mechanism comprising:

an aperture in the cover;

a first securing member coupled to at least one of the cover or the front support, wherein a portion of the first securing member extends through the aperture; and a second securing member releasably coupled to the portion of the first securing member extending through the aperture, such that the cover is coupled between the first securing member and the second securing member.

13. The vehicle jack mounting system of claim 12, wherein at least one of the first securing member or the second securing member is rotatable relative to the other of the first securing member or the second securing member.

14. The vehicle jack mounting system of claim 13, wherein the first securing member and the second securing member are releasably coupled via threads.

15. The vehicle jack mounting system of claim 13, further comprising a third securing member configured to engage at least one of the cover, the first securing member, or the second securing member to prevent the second securing member from decoupling from the first securing member.

16. The vehicle jack mounting system of claim 15, wherein the first securing member is a cap comprising a head and a partially threaded shaft configured to extend through the aperture and the second securing member is a partially threaded riser coupled to the front support.

17. The vehicle jack mounting system of claim 12, further comprising a vehicle jack, the vehicle jack comprising:

a base assembly;

a plurality of rear wheels coupled to the base assembly and positioned in the plurality of rear wheel wells;

a plurality of front wheels coupled to the base assembly and positioned in the plurality of front wheel wells; and a handle positioned beneath the base assembly in the handle supports, wherein the cover in the first position extends over a top of the vehicle jack to secure the vehicle jack within the bracket and in the second position rotates away from the vehicle jack to allow the vehicle jack to be removed from the bracket.

18. A bracket for a vehicle jack, comprising:

a first pair of wheel wells;

a second pair of wheel wells coupled to the first pair of wheel wells via one or more longitudinal members;

a cover rotatably coupled to at least one of the first pair of wheel wells or the second pair of wheel wells, the cover rotatable between a first position and a second position, wherein the cover includes an aperture; and a locking mechanism configured to releasably secure the cover in at least one of the first position or the second position, the locking mechanism comprising:

a riser coupled to the one of the pair of first wheel wells or the pair of second wheel wells between each wheel well of the pair of first wheel wells or the pair of second wheel wells; and a cap rotatably coupled to the cover and configured to selectively couple to the riser, wherein the aperture within the cover receives at least one of the cap or the riser through the cover, such that the cap and riser, when releasably coupled, restrict rotation of the cover from the first position to the second position.

19. The bracket of claim 18, further comprising a locking pin configured to engage at least one of the cover, the cap, or the riser to prevent the cap from decoupling from the riser.

20. The bracket of claim 18, wherein the other of the pair of first wheel wells or the pair of second wheel wells comprises:

a bottom flange lying in a first plane; and a top flange lying in a second plane which intersects the first plane at an acute angle.

* * * * *